(12) United States Patent
Nelson et al.

(10) Patent No.: US 12,491,737 B2
(45) Date of Patent: Dec. 9, 2025

(54) BUMP STOP FOR NON-PNEUMATIC TIRE

(71) Applicant: Bridgestone Americas Tire Operations, LLC, Nashville, TN (US)

(72) Inventors: Brandon P. Nelson, Stow, OH (US); Robert W. Asper, Wadsworth, OH (US); Steven J. Jenkins, Nashville, TN (US); Anthony B. Duncan, Akron, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 600 days.

(21) Appl. No.: 17/789,294

(22) PCT Filed: Dec. 21, 2020

(86) PCT No.: PCT/US2020/066369
§ 371 (c)(1),
(2) Date: Jun. 27, 2022

(87) PCT Pub. No.: WO2021/138108
PCT Pub. Date: Jul. 8, 2021

(65) Prior Publication Data
US 2023/0055889 A1 Feb. 23, 2023

Related U.S. Application Data

(60) Provisional application No. 63/073,660, filed on Sep. 2, 2020, provisional application No. 62/954,728, filed on Dec. 30, 2019.

(51) Int. Cl.
*B60C 7/10* (2006.01)
*B60C 7/14* (2006.01)
*B60C 7/22* (2006.01)

(52) U.S. Cl.
CPC .............. *B60C 7/107* (2021.08); *B60C 7/143* (2013.01); *B60C 7/146* (2021.08); *B60C 7/22* (2013.01)

(58) Field of Classification Search
CPC .. B60C 7/10; B60C 7/107; B60C 7/14; B60C 7/143; B60C 7/146; B60C 7/18; B60C 7/22
See application file for complete search history.

(56) References Cited

U.S. PATENT DOCUMENTS 6,142,203 A * 11/2000 Bickford ................ B60C 11/02
152/394
6,170,544 B1 * 1/2001 Hottebart ................ B60B 9/26
152/5

(Continued)

FOREIGN PATENT DOCUMENTS

| CN | 101909903 | 12/2010 |
| CN | 103612539 | 3/2014 |

(Continued)

OTHER PUBLICATIONS

Search Report and Written Opinion, Corresponding PCT Application Serial No. PCT/US2020/066369; Authorized Officer Bahng, Seung Hoon; aPR. 2, 2021.

(Continued)

*Primary Examiner* — S. Joseph Morano
*Assistant Examiner* — Emily G. Castonguay
(74) *Attorney, Agent, or Firm* — Shaun J. Fox; Bryan J. Jaketic

(57) ABSTRACT

A non-pneumatic tire includes an annular inner ring, an annular outer ring, and a support structure extending from the annular inner ring to the annular outer ring. The support structure includes a plurality of spokes, webbing, cells, or other open-sided support structure. The tire includes a bump stop. The bump stop includes an inner member radially (Continued)

extending from a radially outer surface of the annular inner ring. The inner member has a radially outer surface facing a radially inner surface of the annular outer ring. The bump stop includes an outer member radially extending from a radially inner surface of the annular outer ring. The outer member has a radially inner surface facing a radially outer surface of the annular inner ring.

17 Claims, 21 Drawing Sheets

(56) References Cited

U.S. PATENT DOCUMENTS

| | | | |
|---|---|---|---|
| 6,640,859 B1 | 11/2003 | Laurent et al. | |
| 7,032,634 B2 | 4/2006 | Laurent et al. | |
| 7,950,429 B2 | 5/2011 | Re Fiorentin et al. | |
| 8,127,809 B2 | 3/2012 | Russell | |
| 8,555,941 B2 | 10/2013 | Perron et al. | |
| 8,944,125 B2 | 2/2015 | Manesh et al. | |
| 9,004,120 B2 | 4/2015 | Russell | |
| 9,834,040 B2 | 12/2017 | Benzing, II et al. | |
| 9,849,721 B2 | 12/2017 | Benzing, II et al. | |
| 10,112,442 B2 | 10/2018 | Van de Wiele | |
| 2004/0069385 A1 | 4/2004 | Timoney et al. | |
| 2006/0060280 A1 | 3/2006 | Ladouce et al. | |
| 2008/0257463 A1 | 10/2008 | Re Fiorentin | |
| 2011/0248554 A1* | 10/2011 | Chon | B60C 7/26 |
| | | | 301/95.101 |
| 2012/0234444 A1 | 9/2012 | Palinkas et al. | |
| 2014/0083581 A1* | 3/2014 | Schaedler | B60B 9/02 |
| | | | 152/5 |
| 2014/0367007 A1 | 12/2014 | Thompson | |
| 2015/0083295 A1 | 3/2015 | Resa | |
| 2016/0046153 A1* | 2/2016 | Yoo | B60C 7/107 |
| | | | 152/1 |
| 2016/0200145 A1* | 7/2016 | Asper | B60C 7/14 |
| | | | 152/11 |
| 2016/0214435 A1 | 7/2016 | Schaedler et al. | |
| 2017/0015134 A1 | 1/2017 | Ma | |
| 2017/0087930 A1 | 3/2017 | McMaster et al. | |
| 2017/0087931 A1 | 3/2017 | Gaylo et al. | |
| 2017/0174004 A1 | 6/2017 | Benzing, II | |
| 2017/0174005 A1 | 6/2017 | Van Riper et al. | |
| 2017/0297372 A1* | 10/2017 | Talbot | B60C 9/1807 |
| 2017/0341277 A1 | 11/2017 | Wilson et al. | |
| 2017/0368877 A1 | 12/2017 | Gaylo et al. | |
| 2017/0368878 A1 | 12/2017 | Vilcot | |
| 2017/0368879 A1* | 12/2017 | Lettieri | B60C 7/22 |
| 2018/0001704 A1 | 1/2018 | Reinhardt | |
| 2018/0009263 A1 | 1/2018 | Vilcot | |
| 2018/0050561 A1 | 2/2018 | Benzing, II et al. | |
| 2018/0050567 A1 | 2/2018 | Benzing, II et al. | |
| 2018/0072095 A1 | 3/2018 | Anderfaas et al. | |
| 2018/0086141 A1 | 3/2018 | Schaedler et al. | |
| 2018/0117968 A1 | 5/2018 | Wang et al. | |
| 2018/0141380 A1 | 5/2018 | Celik | |
| 2018/0194169 A1 | 7/2018 | Vilcot et al. | |
| 2018/0326787 A1 | 11/2018 | Pannikottu et al. | |
| 2018/0361790 A1 | 12/2018 | Rigo et al. | |
| 2018/0361791 A1 | 12/2018 | Rigo et al. | |
| 2018/0362077 A1 | 12/2018 | Chen | |
| 2019/0131687 A1 | 5/2019 | Fenkanyn et al. | |

FOREIGN PATENT DOCUMENTS

| | | |
|---|---|---|
| CN | 106671694 | 5/2017 |
| EP | 3263361 | 1/2018 |
| JP | 2011255822 | 12/2011 |
| KR | 101951441 | 2/2019 |
| KR | 1021090090455 | 8/2019 |
| WO | 2003093031 | 11/2003 |
| WO | 2004024470 | 3/2004 |
| WO | 2004037564 | 5/2004 |
| WO | 2005063505 | 7/2005 |
| WO | 2008142625 | 11/2008 |
| WO | 2012171055 | 12/2012 |
| WO | 2016123180 | 8/2016 |
| WO | 2018007658 | 1/2018 |
| WO | 2018020163 | 2/2018 |
| WO | 2018020164 | 2/2018 |
| WO | 2018101937 | 6/2018 |
| WO | 2018102303 | 6/2018 |
| WO | 2018102560 | 6/2018 |
| WO | 2018200142 | 11/2018 |
| WO | 2020018407 | 1/2020 |
| WO | 2021071801 | 4/2021 |

OTHER PUBLICATIONS

European Search Report; Corresponding EP Application No. 20909983.7; Examiner Peter Thanbichler; Dec. 20, 2023.

\* cited by examiner

BUMP STOP FOR NON-PNEUMATIC TIRE

FIELD OF INVENTION

The present disclosure relates to a bump stop for a tire. More particularly, the present disclosure relates to a bump stop that limits deflection of a non-pneumatic tire.

BACKGROUND

While various tire constructions enable a tire to run in an uninflated or underinflated condition, non-pneumatic tires do not require inflation. Rather, non-pneumatic tires include a plurality of spokes, webbing, cells, or other open-sided support structure that connects an inner ring to an outer ring. Some non-pneumatic tires include a tread mounted to the outer ring and a rim mounted to the inner ring. One or more of the plurality of spokes, webbing, cells, or other open-sided support structure, inner ring, outer ring, and rim may be manufactured from a material that plastically deforms when a load or force greater than its elastic limit is imparted.

During operation, a tire is subjected to a variety of loading conditions. Normal loading can subject one or more components of the tire to loads within an elastic range of a material from which the one or more components are manufactured, while extreme loading can subject one or more components of the tire to loads greater than the elastic limit of the material. For example, tires may experience normal loading when operated on a smooth road surface and extreme loading when operated on a road surface that includes potholes, cracks, rocks, and other debris, referred to generally herein as "bumps."

When the tire encounters such bumps, one or more of the plurality of spokes, webbing, cells, or other open-sided support structure, inner ring, outer ring, and rim undergo extreme loading that results in plastic deformation. Plastic deformation may cause a tire to function poorly for its intended purpose or may render the tire inoperable. Accordingly, bump stops for controlling, reducing, eliminating, and preventing plastic deformation of non-pneumatic tires are needed.

Manufacturing a non-pneumatic tire with such a bump stop, however, can be challenging. Specifically, providing a bump stop that is located substantially centrally along an axial direction of the non-pneumatic tire may present manufacturing challenges.

SUMMARY OF THE INVENTION

In one embodiment, a non-pneumatic includes an annular inner ring, an annular outer ring, and a support structure extending from the annular inner ring to the annular outer ring. A tread is disposed radially around the annular outer ring. The tire includes a bump stop including an inner member radially extending from a radially outer surface of the annular inner ring. The inner member has a radially outer surface. A first radial distance from the radially outer surface of the annular inner ring to the radially outer surface of the inner member is less than a second radial distance from the radially outer surface of the annular inner ring to an outer surface of the tread.

In another embodiment, a non-pneumatic tire includes an annular inner ring, an annular outer ring, and a support structure extending from the annular inner ring to the annular outer ring. A tread is disposed radially around the annular outer ring. The tire includes a bump stop including an outer member radially extending from a radially inner surface of the annular outer ring. The outer member has a radially inner surface facing a radially outer surface of the annular inner ring.

In yet another embodiment, a non-pneumatic tire includes an annular inner ring, an annular outer ring, and a support structure extending from the annular inner ring to the annular outer ring. A tread is radially disposed relative to the annular outer ring. The tire includes s bump stop including a member having a radially inner surface facing a radially outer surface of the annular inner ring and a radially outer surface facing a radially inner surface of the annular outer ring.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Tread" as used herein, refers to that portion of the tire that comes into contact with the road or ground under normal inflation and normal load.

While similar terms used in the following descriptions describe common tire components, it should be understood that because the terms carry slightly different connotations, one of ordinary skill in the art would not consider any one of the following terms to be purely interchangeable with another term used to describe a common tire component.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the side of the tire. Thus, when relative directional terms such as "inner" and "outer" are used in connection with an element, the "inner" element is spaced closer to the equatorial plane of the tire than the "outer" element.

Figure 1:
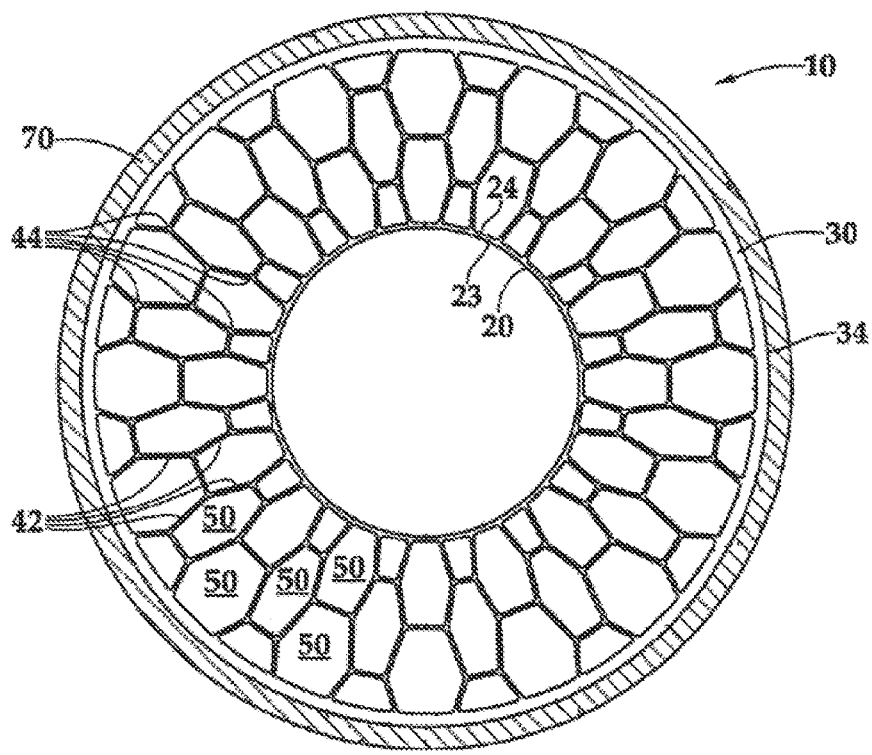
FIG. 1 is a front view of an undeformed non-pneumatic tire known in the prior art.
Figure 2:
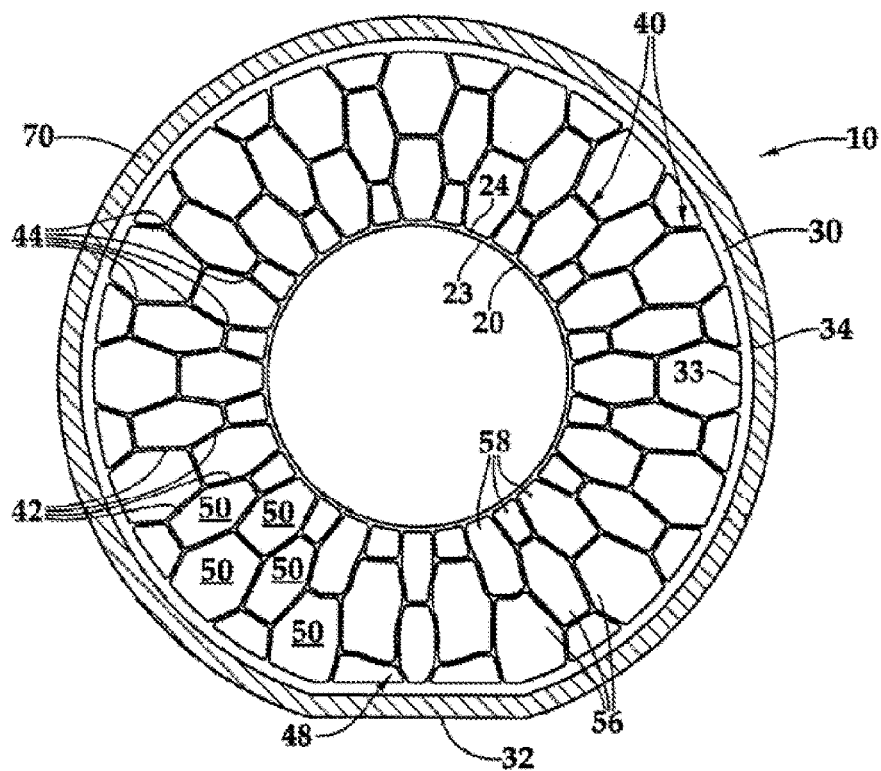
FIG. 2 is a front view of the non-pneumatic tire of FIG. 1 being deformed when subjected to a load.

FIGS. 1 and 2 illustrate one embodiment of a non-pneumatic tire 10 known in the art. The non-pneumatic tire 10 is merely an exemplary illustration of a tire. It is not intended to be limiting.

In the illustrated embodiment, the non-pneumatic tire 10 includes a generally annular inner ring 20 that has an internal surface 23 and an external surface 24 and a generally annular outer ring 30 that has an internal surface 33 and an external surface 34. The generally annular inner ring 20 and the generally annular outer ring 30 can be made of cross-linked or uncross-linked polymers. In this disclosure, the term "polymer" means cross-linked or uncross-linked polymers.

The non-pneumatic tire 10 further includes an interconnected web 40 that connects the generally annular inner ring 20 and the generally annular outer ring 30. The interconnected web 40 is a support structure extending radially from the outer surface 24 of the generally annular inner ring 20 to the inner surface 33 of the generally annular outer ring 30.

In the illustrated embodiment, the interconnected web 40 has at least two radially adjacent layers 56, 58 of web elements 42, 44 that define a plurality of generally polygonal openings 50. In alternative embodiments, a plurality of spokes or other open-celled support structure can connect the inner ring 20 to the outer ring 30.

In one embodiment, the generally annular inner ring 20 and the generally annular outer ring 30 are made of the same material as the interconnected web 40. The generally annular inner ring 20, the generally annular outer ring 30, and the interconnected web 40 can be made by injection or compression molding, casting, additive manufacturing, or any other method generally known in the art.

The internal surface 23 of the generally annular inner ring 20 is configured to engage a rim assembly (not shown) to which the tire 10 is mounted. A tread layer 70 is attached to the outer surface 34 of the generally annular outer ring 30.

Attachment can be done adhesively, through chemical bonding, or using other methods commonly available in the art.

As shown in FIG. 2, the outer ring 30 can be configured to deform in an area 48 around and including a footprint region 32 of the tread layer 70, which decreases vibration and increases ride comfort of the tire 10.

Figure 3:
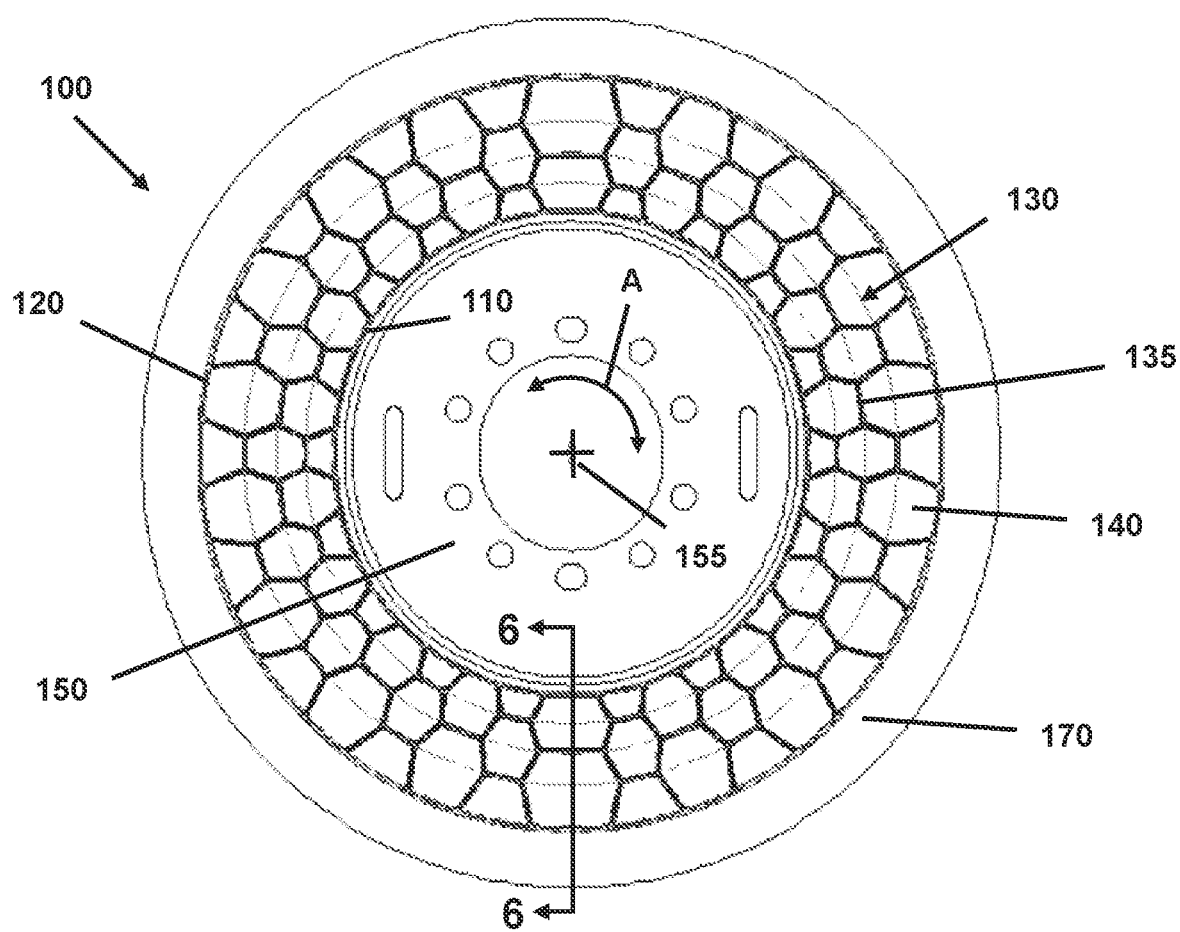
FIG. 3 is a front view of a non-pneumatic tire known in the prior art showing the support structure mounted on a rim assembly.

FIG. 3 illustrates a front view of another embodiment of a tire 100 known in the art having a generally annular inner ring 110, a generally annular outer ring 120, and an internal support structure in the form of a flexible, interconnected web 130 extending between the inner ring 110 and the outer ring 120. The flexible, interconnected web 130 is formed by a plurality of web elements 135 that define polygonal openings 140. In this particular embodiment, the web elements 135 form a plurality of hexagonal and substantially trapezoidal shapes, including an outer series of alternating hexagonal and trapezoidal opening and an inner series of alternating hexagonal and trapezoidal openings. It should be understood that the geometries shown in FIGS. 1-3 are merely exemplary and that any geometries may be employed. Similarly, a plurality of spokes, webbing, cells, or other open-sided support structure may be employed instead of an interconnected web. Discussion of the interconnected web 130, therefore, is intended to refer to the illustrated interconnected web 130 as well as a plurality of spokes, webbing, cells, or other open-sided support structure, unless otherwise noted. Thus, for convenience and not limitation, the illustrated interconnected web 130 may be a plurality of spokes, webbing, cells, or other open-sided support structure without departing from the scope of the disclosure.

FIG. 3 additionally shows the tire 100 mounted on a rim assembly 150 at the generally annular inner ring 110. The rim assembly 150 may be rotated about rotation axis 155 (as shown by arrow A). Rotation can be imparted by an axle of a vehicle, or by other means to rotate the tire 100. A tread 170 is attached to the generally annular outer ring 120. The tread 170 can be manufactured from rubber or other elastomeric material.

Figure 4:
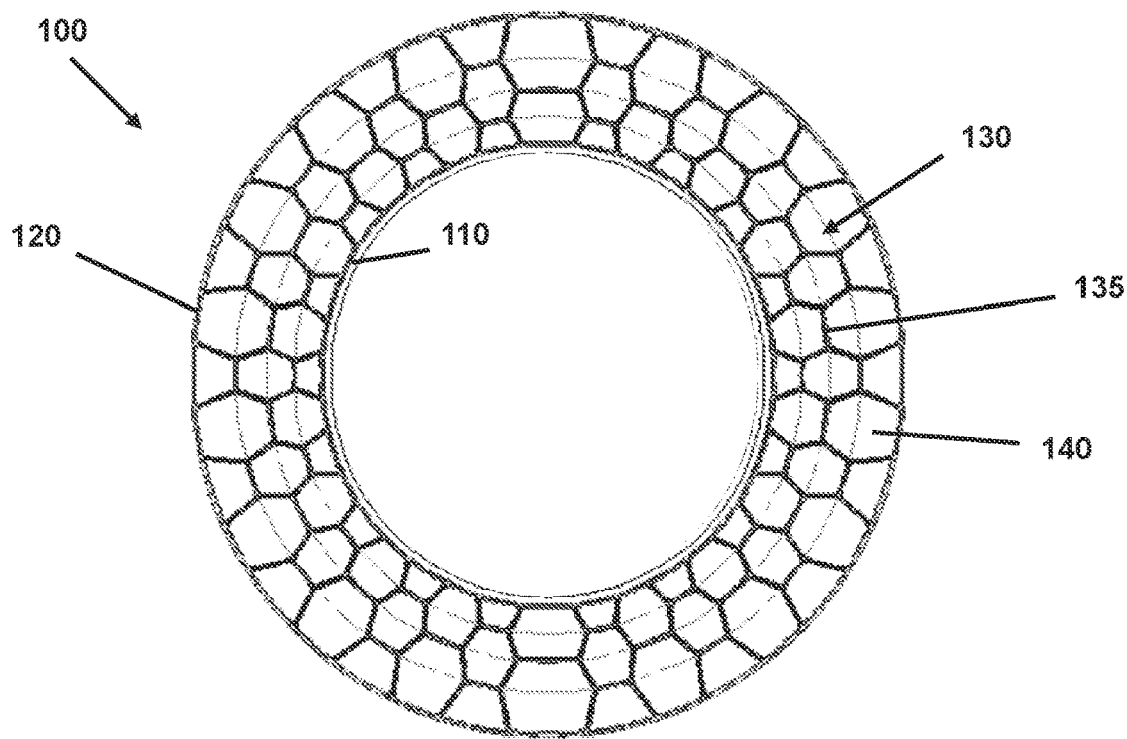
FIG. 4 is a front view of the interconnected web of the non-pneumatic tire of FIG. 3 showing the interconnected web as an integral component.
Figure 5:
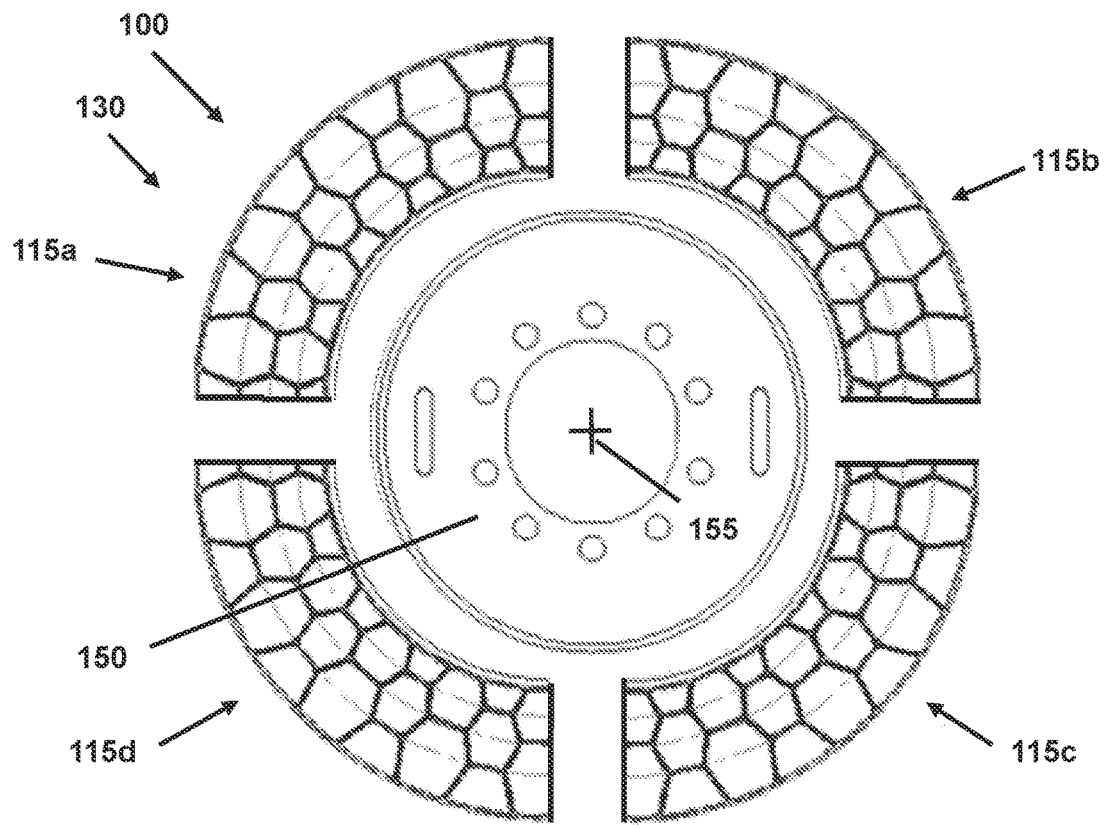
FIG. 5 is a front view of the interconnected web of the non-pneumatic tire of FIG. 3 showing the interconnected web as a plurality of components that may be secured to a rim assembly.

FIG. 4 shows the interconnected web 130 of the tire 100 of FIG. 3 as an integral component that can be axially mounted on the rim assembly 150 as illustrated in FIG. 3. The interconnected web 130 can be one or more of formed, molded, manufactured, or assembled to provide an integral, circumferentially continuous structure. FIG. 5 shows the interconnected web 130 of the tire 100 of FIG. 3 as a plurality of components 115a-115d that may be radially secured to the rim assembly 150. Each component 115a, 115b, 115c, 115d of the interconnected web 130 can be one or more of formed, molded, manufactured, or assembled as a separate sections each of which may be independently mounted on a circumferential portion of the rim assembly 150.

Figure 6:
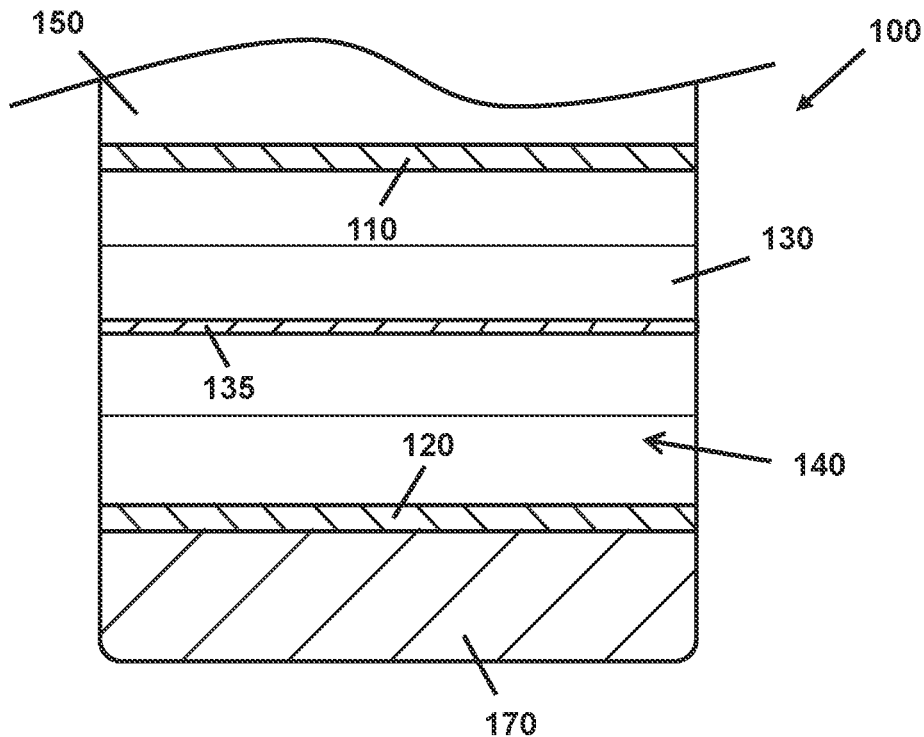
FIG. 6 is a partial cross-sectional view of the tire of FIG. 3 taken along line 6-6 of FIG. 3 showing a single interconnected web spanning the axial width of the tire.
Figure 7:
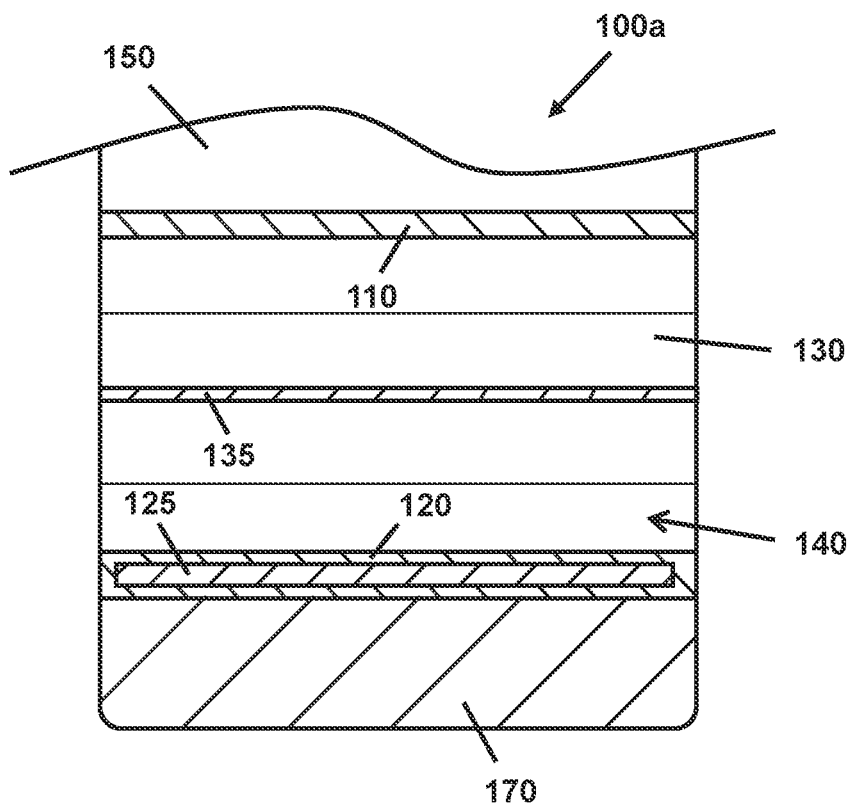
FIG. 7 is a partial cross-sectional view of another tire similar to the tire of FIG. 6 showing a steel band mounted relative to the interconnected web.

FIG. 6 is a partial cross-sectional view of the tire 100 of FIG. 3 taken along line 6-6 of FIG. 3 showing a single interconnected web 130 spanning an axial width of the tire 100. FIG. 7 is a partial cross-sectional view of another tire 100a similar to the tire 100 of FIG. 6 showing a band 125 mounted relative to the interconnected web 130. The band 125 extends circumferentially around the tire 100a and circumscribes the axis 155 (see FIG. 3) of the tire 100a. In one embodiment, the band 125 is a shear band. That is, the band 125 may be formed by a pair of inextensible layers (such as cords of steel, nylon, or other metal or polymer, or sheets of steel, nylon, or other metal or polymer) separated by an extensible member (such as rubber or other elastomeric material). Alternatively, the band 125 may be a metal band such as a steel band, although other materials may be employed. The band 125 is shown as being embedded within the outer annular ring 120, although the band 125 may be mounted on the outer diameter of the outer annular ring 120 or on the inner diameter of the outer annular ring 120.

Figure 8:
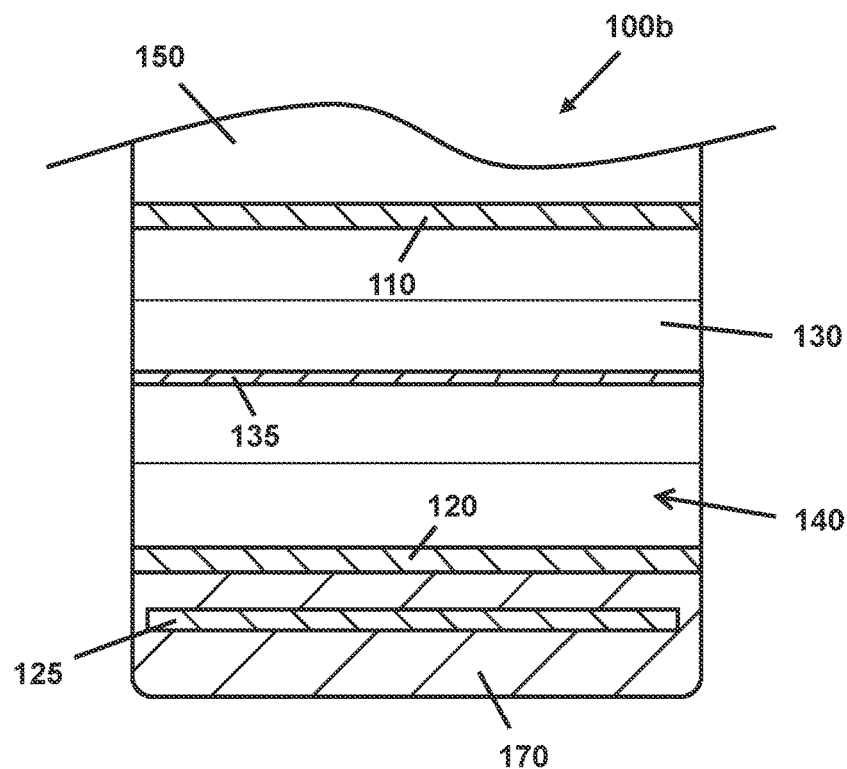
FIG. 8 is a partial cross-sectional view yet another tire similar to the tire of FIG. 6 showing a steel band mounted relative to the tread.

FIG. 8 is a partial cross-sectional view of another tire 100b similar to the tire 100 of FIG. 6 showing a band 125 mounted relative to the tread 170. As illustrated, the band 125 is embedded within the tread 170. The band 125 here is substantially the same as the band 125 described above with respect to FIG. 7, including all of the alternative embodiments. While the band 125 is shown is being encapsulated by the tread rubber 170, in an alternative embodiment, the band is disposed between the outer ring and the tread rubber.

During operation, the tire 100b is subjected to a variety of loading conditions, including normal loading, and in certain instances, extreme loading. For purposes of the disclosure, normal loading can subject one or more components of the tire 100b to loads within an elastic range of a material from which the one or more components are manufactured, while extreme loading can subject one or more components of the tire 100b to loads greater than the elastic limit of the material. For purposes of the disclosure, the elastic limit of a material is the maximum extent to which a solid may be loaded or stretched without permanent alteration (e.g., deformation) of size or shape. Loads greater than the elastic limit of the material may cause plastic deformation, where the material experiences permanent distortion based on stresses that exceed the yield strength of the material. For example, the tire 100b may experience normal loading when operated on a smooth road surface and extreme loading when operated on a road surface that includes potholes, cracks, rocks, and other debris, referred to generally herein as "bumps."

Figure 9:
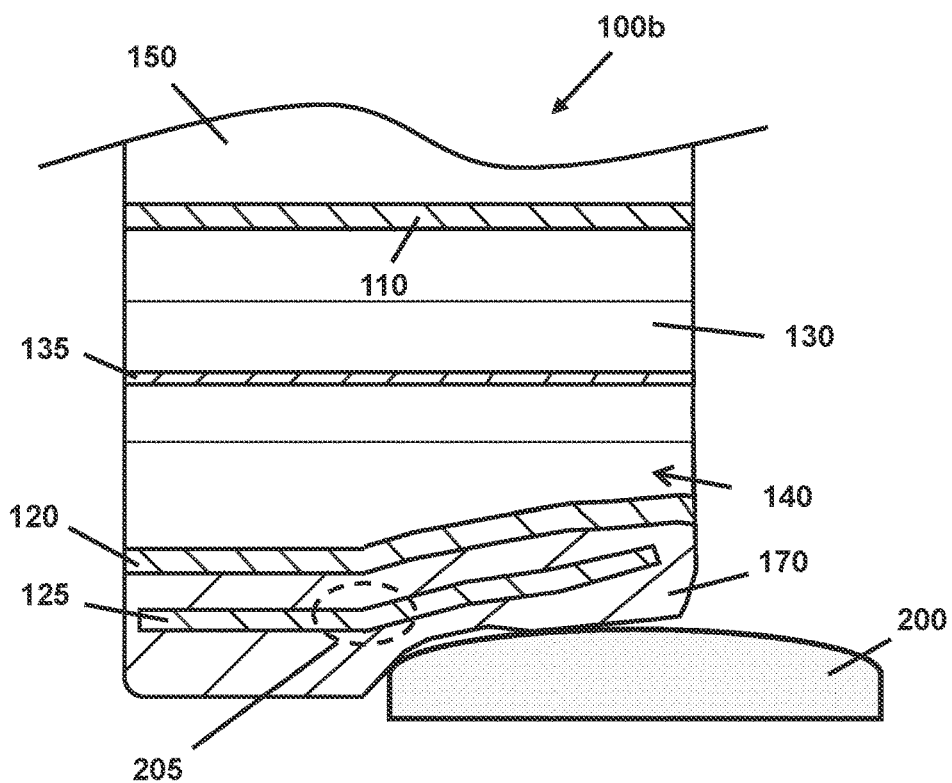
FIG. 9 is a partial cross-sectional view of the tire of FIG. 8 showing the steel band mounted relative to the tread and undergoing plastic deformation as a result of loading imparted by a bump.

FIG. 9 is the partial cross-sectional view of the tire 100b of FIG. 8 showing the band 125 mounted relative to the tread 170 undergoing plastic deformation as a result of loading imparted by a bump 200. Once plastically deformed, the band 125 is damaged and the tire 100b is unusable. In particular, one or more of the interconnected web 130, plurality of spokes, webbing, cells, or other open-sided support structure, annular inner ring 110, annular outer ring 120, and rim assembly 150 plastically deforms when a load or force greater than its elastic limit is imparted. When the tire 100b encounters a bump 200, one or more of the interconnected web 130, plurality of spokes, webbing, cells, or other open-sided support structure, annular inner ring 110, annular outer ring 120, and rim assembly 150 undergo loading, and in some cases undergo extreme loading that results in plastic deformation. In the illustrated embodiment, the bump 200 plastically deforms the band 125 at 205. Plastic deformation may cause the tire 100b to function poorly for its intended purpose or may render the tire 100b inoperable. Accordingly, bump stops for controlling, reducing, eliminating, and preventing plastic deformation of non-pneumatic tires are needed.

Figure 10:
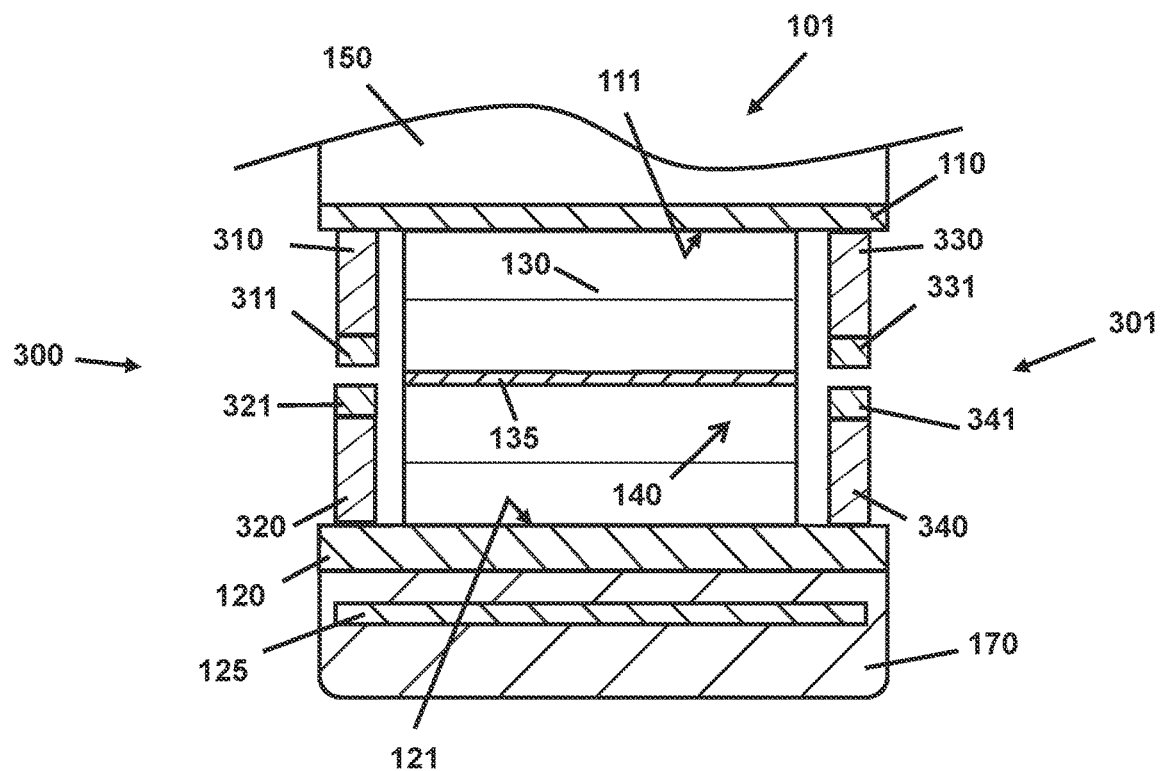
FIG. 10 is a partial cross-sectional view of one embodiment of a non-pneumatic tire having an exemplary bump stop.

FIG. 10 shows bump stops 300, 301 employed with a non-pneumatic tire 101 having a single interconnected web 130 centrally disposed along the width of the tire 101 relative to the rotation axis (see FIG. 3, axis 155) of the tire 101. Bump stop 300 is positioned on a first axial side of the interconnected web 130, and bump stop 301 is positioned on an opposite axial side of the interconnected web 130. Bump stop 300 includes an inner member 310 extending radially outward from the annular inner ring 110 and an outer member 320 extending radially inward from the annular outer ring 120. The inner member 310 can be fixed to surface 111 of the inner ring 110 with a mechanical fastener, adhesive, welding, brazing, or a chemical bonding process, which may include heating, or other method of coupling. The outer member 320 can be fixed to surface 121 of the outer ring 120 in a same or similar manner.

The inner member 310 and the outer member 320 extend radially to a distance defined between the annular inner ring 110 and the annular outer ring 120. A gap is defined between a radially outer surface of the inner member 310 and a radially inner surface of the outer member 320. In the illustrated embodiment, the inner member 310 includes a compliant end 311 that defines the radially outer surface of the inner member 310, and the outer member 320 includes a compliant end 321 that defines the radially inner surface of the outer member 320.

Similarly, bump stop 301 positioned on an opposite axial side of the interconnected web 130 includes the same or similar features in the same or similar configuration as bump stop 300. For example, bump stop 301 includes inner member 330 with compliant end 331 defining the radially outer surface of the inner member 330, and outer member 340 with compliant end 341 defining the radially inner surface of the outer member 340. The radially outer surface faces the radially inner surface with the gap defined between the radially outer surface of the inner member 330 and the radially inner surface of the outer member 340. The first member 310, 330 and the second member 320, 340 are manufactured from a load bearing material (e.g., metal, steel, polymer) configured to withstand a predetermined load. Compliant end 311, 321, 331, 341 may be constructed of a flexible material such as rubber or elastomer and are configured to elastically deform more than the load bearing material of the first and second members 310, 320, 330, 340 when subjected to the predetermined load. Thus, a modulus of elasticity of the compliant end 311, 321, 331, 341 is less than a modulus of elasticity of the inner and outer members 310, 330, 320, 340.

Figure 11:
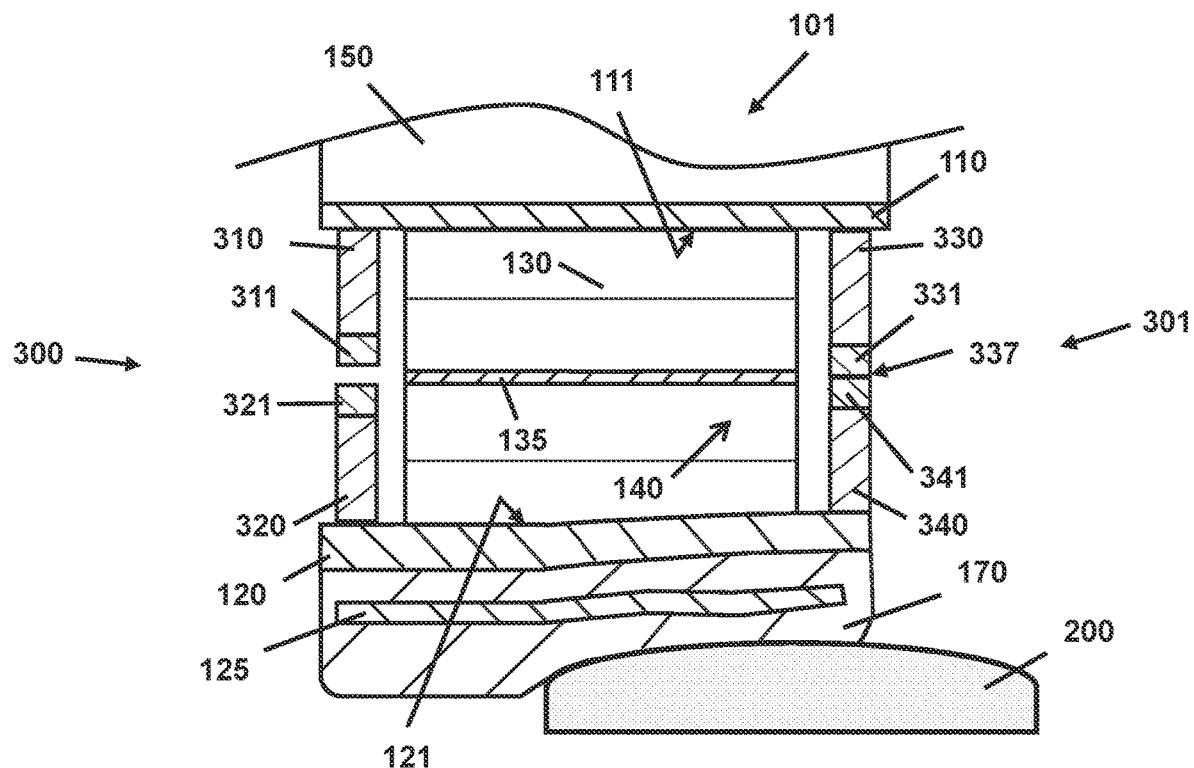
FIG. 11 is a partial cross-sectional view of the tire of FIG. 10 showing the bump stomp preventing the steel band mounted relative to the tread from undergoing plastic deformation when subjected to loading by a bump.

FIG. 11 shows the non-pneumatic tire 101 of FIG. 10 undergoing loading from bump 200. As shown on the right-hand side of FIG. 10, bump stop 301 prevents band 125 from being loaded above its elastic limit. In particular, the radially outer surface of the inner member 330 faces and abuts the radially inner surface of the outer member 340 at interface 337. The inner member 330 and the outer member 340 are configured to prevent plastic deformation of the band 125 and other components of the tire 101 (e.g., annular outer ring 120, interconnected web 130, and annular inner ring 110). Without intending to be bound by theory, the illustrated bump stop 301 limits deformation of the band 125, webbing 130 (or spokes or other support structure), and other components of the tire 101 thereby preventing the band 125 and other components from being stressed beyond their respective elastic limits.

Comparing the tire 100b of FIG. 9 with the tire 101 of FIG. 11, the tire 100b in FIG. 9 undergoes larger deformation when subjected to loading by the bump 200 than the tire 101 in FIG. 11 because the bump stop 301 limits deformation when the radially outer surface of the inner member 330 abuts the radially inner surface of the outer member 340 at interface 337. Each exemplary bump stop described herein may be manufactured as solid circumferentially continuous structure, a circumferentially continuous structure with one or more openings (e.g., circular, rectangular, triangular, or other polygonal shaped opening), or a circumferentially discontinuous structure manufactured in radial sections, or manufactured as a plurality of radially extending rods or other projections.

Figure 12:
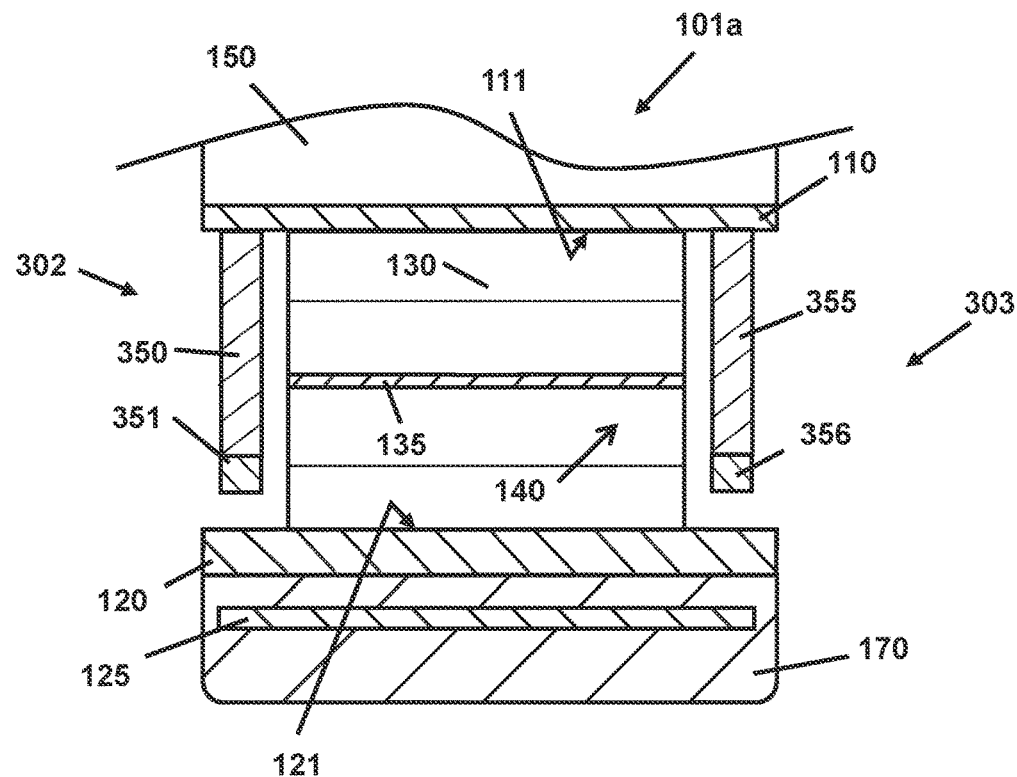
FIG. 12 is a partial cross-sectional view of an alternative embodiment of a tire having another exemplary bump stop.

FIGS. 12-15 show other example embodiments of bump stops employed with non-pneumatic tires 101a, 101b, 101c, 101d. In FIG. 12, tire 101a includes bump stops 302, 303. Bump stop 302 includes a planar inner member 350 extending from surface 111 of the annular inner ring 110. The planar inner member 350 includes a compliant end 351 defining a radially outer surface that faces and is configured to abut surface 121 of the annular outer ring 120. Likewise, bump stop 303 includes a planar inner member 355 extending from surface 111 of the annular inner ring 110 and includes compliant end 356 defining a radially outer surface that faces and is configured to abut surface 121 of the annular outer ring 120. Each of the radially outer surfaces is spaced from surface 121 of the annular outer ring 120 defining respective gaps.

When subjected to loading, one or both of the gaps can close such that the respective radially outer surfaces abut surface 121 of the annular outer ring 120, thereby restricting deformation of the band 125, webbing 130 (or spokes or other support structure), and other components of the tire 101a. As noted, restricting deformation of the band 125, keeps stresses to which it is subjected less than the elastic limit of the component and avoids plastic deformation. Although shown as extending from surface 111 of annular inner ring 110, in other embodiments, one or both of the bump stops 302, 303 can be reversed to extend from surface 121 of the annual outer ring 120. In such a configuration, the bump stop would prevent plastic deformation by abutting surface 111 of the annular inner ring 110 when subjected to loading.

Figure 13:
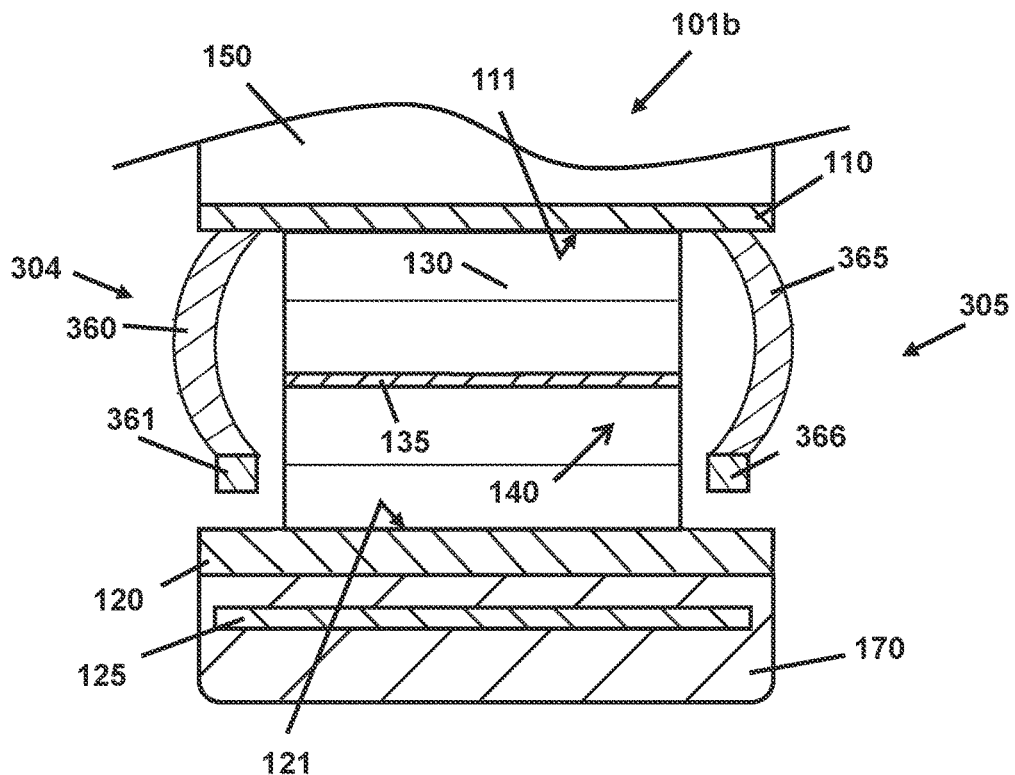
FIG. 13 is a partial cross-sectional view of another alternative embodiment of a tire having yet another exemplary bump stop.

In FIG. 13, tire 101b includes bump stops 304, 305. Bump stop 304 includes a non-planar inner member 360 extending from surface 111 of the annular inner ring 110. The non-planar inner member 360 includes compliant end 361 defining a radially outer surface spaced from surface 121 by a gap. Likewise, bump stop 305 includes a non-planar inner member 365 extending from surface 111 of the annular inner ring 110 and includes compliant end 366 defining a radially outer surface spaced from surface 121 by a gap. When the tire 101b is subjected to extreme loading, each of the radially outer surfaces is configured to abut surface 121 of the annular outer ring 120. When one or both of the gaps closes, and the respective radially outer surfaces abut surface 121 of the annular outer ring 120, the non-planar inner members 360, 365 may bend in a predetermined direction defined by the non-planar structure of the member.

In the illustrated embodiment, each non-planar inner member 360, 365 is pre-curved in a direction away from the circumferential axis of the tire 101b. When loaded, the pre-curved non-planar inner members 360, 365 are structured to bend away from the circumferential axis of the tire 101b, thereby directing deformation of the member 360, 365 away from the tire 101b and avoiding contact with the interconnected web 130. Other non-planar shapes and forms can be employed to define a predetermined manner or direction of deformation of the bump stops 304, 305, such as triangular, diamond, and other curved profiles. Although shown as extending from surface 111 of annular inner ring 110, in other embodiments, one or both of the bump stops 304, 305 can be reversed to extend from surface 121 of the annual outer ring 120. In such a configuration, the bump stop would abut surface 111 of the annular inner ring 110 when subjected to loading to prevent plastic deformation of the band 125 and other components of the tire 101b. Non-planar bump stops may be employed with other bump stops described herein, including bump stops illustrated with planar profiles.

Figure 14:
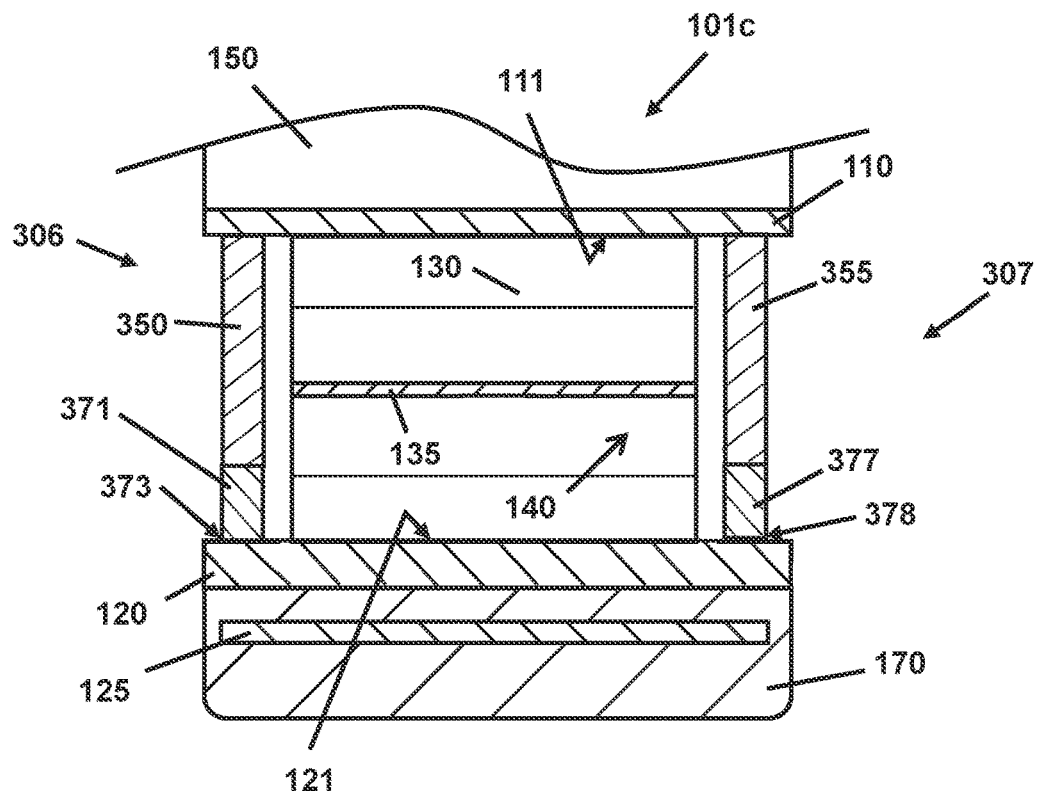
FIG. 14 is a partial cross-sectional view of yet another alternative embodiment of a tire having still another exemplary bump stop.

FIG. 14 shows another example of tire 101c that includes bump stops 306, 307. As with the bump stop 302 shown in FIG. 12, bump stop 306 includes planar inner member 350 extending from surface 111 of the annular inner ring 110. In the embodiment shown in FIG. 14, the planar inner member 350 includes a compliant end 371 that abuts surface 121 of the annular outer ring 120. The compliant end 371 includes a radially outer surface that faces and abuts surface 121 at interface 373. Likewise, bump stop 307 includes planar inner member 355 extending from surface 111 of the annular inner ring 110 and a compliant end 377 that abuts surface 121 of the annular outer ring 120. The compliant end 377 includes a radially outer surface that faces and abuts surface 121 at interface 378. The radially outer surfaces of the compliant ends 371, 377 can be attached (e.g., glued, bonded, fastened) to surface 121 of the annular outer ring 120 or can be positioned in contact with the surface 121 without being attached to the surface 121. As shown, by providing the radially outer surfaces of the compliant ends 371, 377 abutting surface 121 of the annular outer ring 120, the bump stops 306, 307 (i.e., planar inner members 350, 355 and compliant ends 371, 377) occupy the entire space between surface 111 of the annular inner ring 110 and surface 121 of the annular outer ring 120 without any gaps therebetween.

Because the interconnected web 130 is open-sided, road dirt, water, sand, mud, or other debris can accumulate on or within openings of the structure. For example, with respect to FIG. 12, debris can enter through the gaps between the bump stops 306, 307 and accumulate on the interconnected web 130. With respect to FIG. 14, however, because the planar inner members 350, 355 and compliant ends 371, 377 occupy the entire space between surface 111 of the annular inner ring 110 and surface 121 of the annular outer ring 120, interconnected web 130 is isolated from the environment and the bump stops 306, 307 prevent accumulation of debris on the interconnected web 130.

Figure 15:
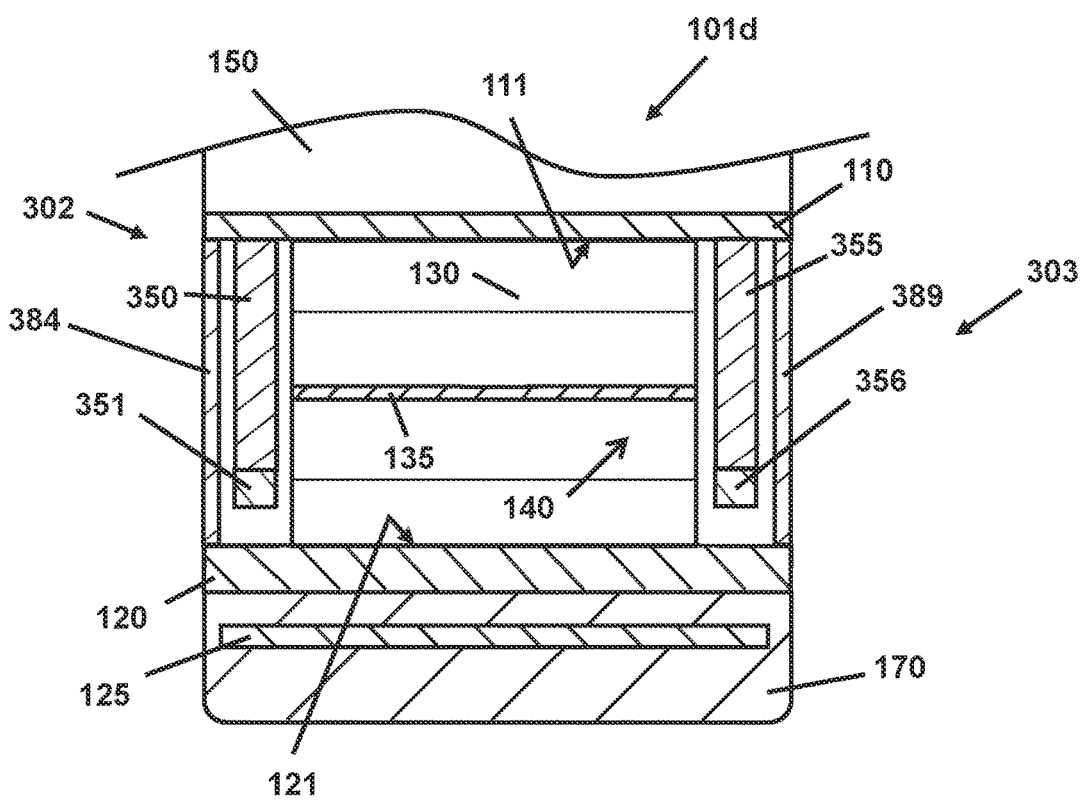
FIG. 15 is a partial cross-sectional view of still another alternative embodiment of a tire including an exemplary bump stop of FIG. 12 and further including a sidewall.

FIG. 15 provides another embodiment of tire 101d that includes bump stops 302, 303 as described with respect to FIG. 12. Additionally, the illustrated embodiment in FIG. 15 includes sidewalls 384, 389. The sidewalls 384, 389 are not intended to carry significant loading and may be manufactured from a compliant material (e.g., rubber, elastomer) so as to be flexible and durable. Similar to the bump stops 306, 307 of FIG. 14, the sidewalls 384, 389 occupy the entire space between surface 111 of the annular inner ring 110 and surface 121 of the annular outer ring 120. Each sidewall 384, 389 can be attached (e.g., glued, bonded, fastened) to surface 121 of the annular outer ring 120 and surface 111 and the annular inner ring 110.

In other embodiments (not shown), one or both sidewalls 384, 389 can be attached (e.g., glued, bonded, fastened) to an axially outermost side of either of the annular inner ring 110 and the annular outer ring 120. In still other embodiments (not shown), one or both sidewalls 384, 389 can be attached (e.g., glued, bonded, fastened) to tread 170 or rim assembly 150. In another embodiment, one or both sidewalls 384, 389 can be attached (e.g., glued, bonded, fastened) to the planar inner members 350, 355 of the bump stops 302, 303. Thus, the sidewalls 384, 389 isolate the interconnected web 130 from the environment and prevent accumulation of debris on the interconnected web 130. As an added benefit, the sidewalls 384, 389 may provide the tire 101d with a visual appearance that customers who are accustomed to the solid look of the sidewall of a pneumatic tire may appreciate.

Figure 16:
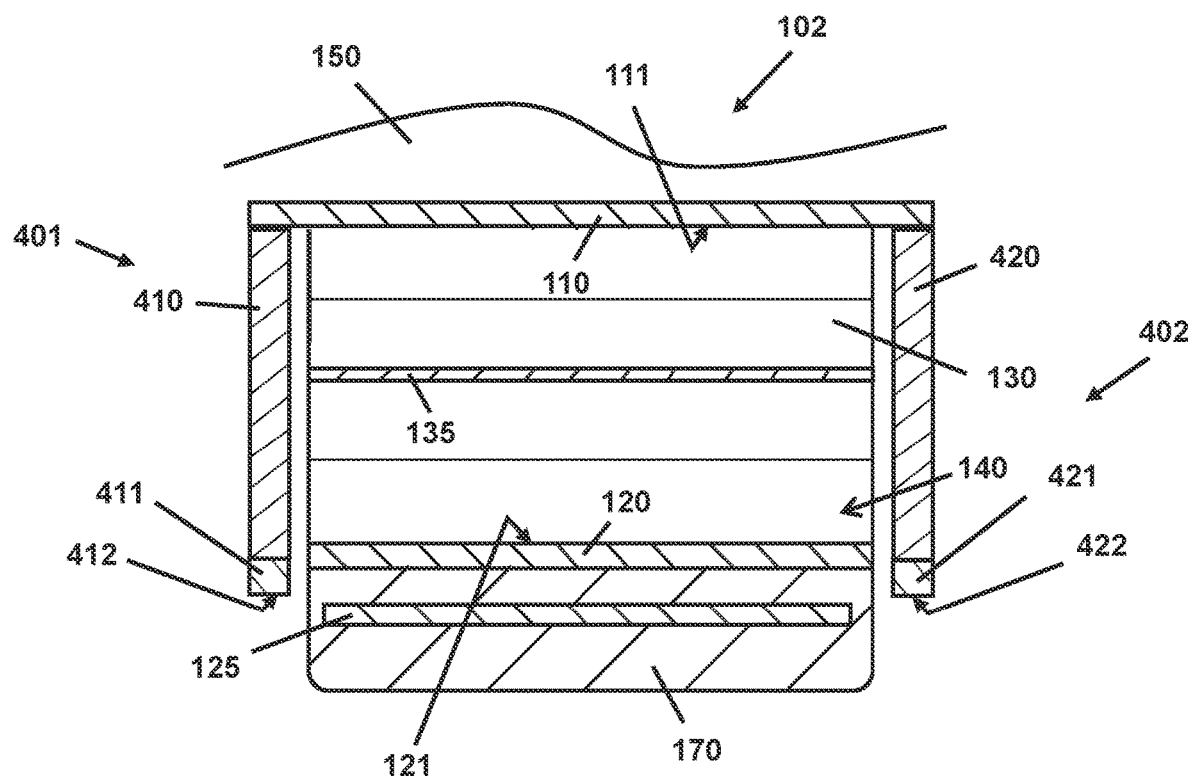
FIG. 16 is a partial cross-sectional view of yet another alternative embodiment of a non-pneumatic tire having still another exemplary bump stop.

FIG. 16 shows another example of bump stops 401, 402 employed with non-pneumatic tire 102 having a single interconnected web 130 centrally disposed along the width of the tire 102 relative to the rotation axis (see FIG. 3, axis 155) of the tire 102. Bump stop 401 is positioned on a first axial side of the interconnected web 130, and bump stop 402 is positioned on an opposite axial side of the interconnected web 130. Bump stop 401 includes an inner member 410 extending radially outward from the annular inner ring 110. The inner member 410 can be fixed to surface 111 of the inner ring 110 with a mechanical fastener, adhesive, welding, brazing, or a chemical bonding process, which may include heating, or other method of coupling.

The inner member 410 extends radially from the annular inner ring 110. In the illustrated embodiment, the bump stop 401 extends past the annular outer ring 120. In an alternative embodiment, the bump stop 401 does not extend past the annular outer ring 120. A radially outer surface 412 of the inner member 410 faces the road surface and is offset from the surface of the tread 170. A compliant end 411 that defines the radially outer surface 412 of the inner member 410 is, therefore, oriented to directly contact bumps and absorb the extreme loading caused by the bumps.

Similarly, bump stop 420 on an opposite axial side of tire 102 includes an inner member 420 that extends radially from the annular inner ring 110. In the illustrated embodiment, the bump stop 402 extends past the annular outer ring 120. In an alternative embodiment, the bump stop 402 does not extend past the annular outer ring 120. A radially outer surface 412 of the inner member 420 faces the road surface and is offset from the tread 170, and a compliant end 421 defines the radially outer surface 422 of the inner member 420 oriented to directly contact bumps and absorb the extreme loading caused by the bumps.

The radially outer surface 412, 422 of each inner member 410, 420 is located a greater radial distance from the axis of the tire 102 than the annular outer ring 120. Accordingly, the bump stops 401, 402 will be loaded by a bump prior to the annular outer ring 120, thereby reducing the risk of damage to the outer ring 120 and the interconnected web 130. In other embodiments, the radially outer surface 412, 422 of each inner member 410, 420 may be located a smaller radial distance from the axis of the tire 102 than the annular outer ring 120, or a greater radial distance from the axis of the tire 102 than the circumferential location of the band 125.

Because the radially outer surfaces 412, 422 of the inner members 410, 420 face the road surface, extreme loading transfers through the inner member 410 to the inner ring 110 without structurally modifying the interconnected web 130. Thus, bump stops 401, 402 may be aftermarket accessories that can be added to an existing non-pneumatic tire. Additionally, the bump stops 401, 402 can be removed from the tire 102. For example, the inner members 410, 420 may be fastened to the inner ring 110 with a removable fastener (e.g., bolt, clamp) such that the bump stops 401, 402 can be removed when not needed and repaired or replaced if damaged.

Figure 17:
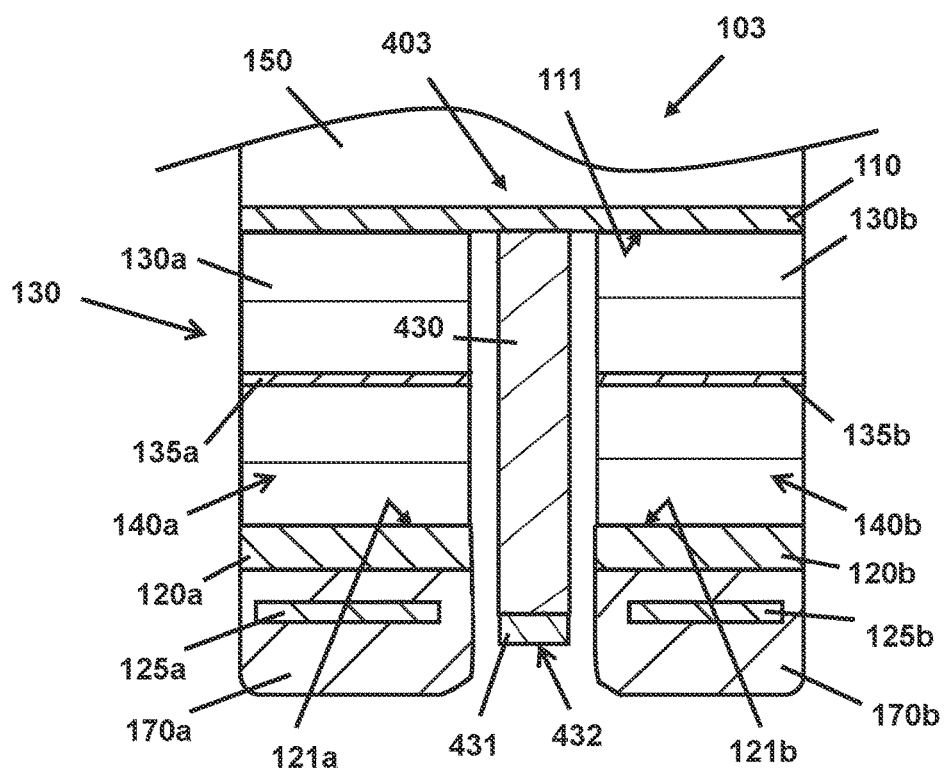
FIG. 17 is a partial cross-sectional view of still another embodiment of a non-pneumatic tire having yet another exemplary bump stop.

FIG. 17 shows another embodiment of a tire 103 similar to the tire 102 shown in FIG. 16, except that the bump stop 403 is centrally positioned relative to the axis of tire 103 with the interconnected web 130 disposed on either side of the bump stop 403. Thus, the tire 103 includes an inner ring 110, a first interconnected web 130a formed by a plurality of first web elements 135a that define first polygonal openings 140a and a second interconnected web 130b formed by a plurality of web elements 135b that define polygonal openings 140b. Each interconnected web 130a, 130b has a respective annular outer ring 120a, 120b, tread 170a, 170b, and band 125a, 125b.

The bump stop 403 includes an inner member 430 that extends radially from the annular inner ring 110. In the illustrated embodiment, the bump stop 401 extends past the annular outer ring 120. In an alternative embodiment, the bump stop 401 does not extend past the annular outer ring 120. A radially outer surface 432 of the inner member 430 faces the road surface and is offset from the surfaces of the treads 170a, 170b. A compliant end 431 that defines the radially outer surface 432 of the inner member 430 is, therefore, oriented to directly contact bumps and absorb the extreme loading caused by the bumps.

The tire 103 illustrated in FIG. 17 can be manufactured by starting construction from one axial side and sequentially constructing the tire 103 to completion at the opposite axial side. For example, the first interconnected web 130a, bump stomp 403, and second interconnected web 130b may be constructed as continuous annular pieces (see FIG. 4) that are axially aligned on assembly 150 in sequential order. Similarly, the bump stomp 403 may be constructed on assembly 150 as a continuous annular piece and then each interconnected web 130a, 130b may be added to the assembly 150 on either axial side of the bump stop 403. Alternatively, the first and second interconnected webs 130a, 130b can be constructed on assembly 150 and bump stop 403 may then be added to the assembly 150 as separate components (see FIG. 5) by radially securing each component to the assembly 150.

Figure 18:
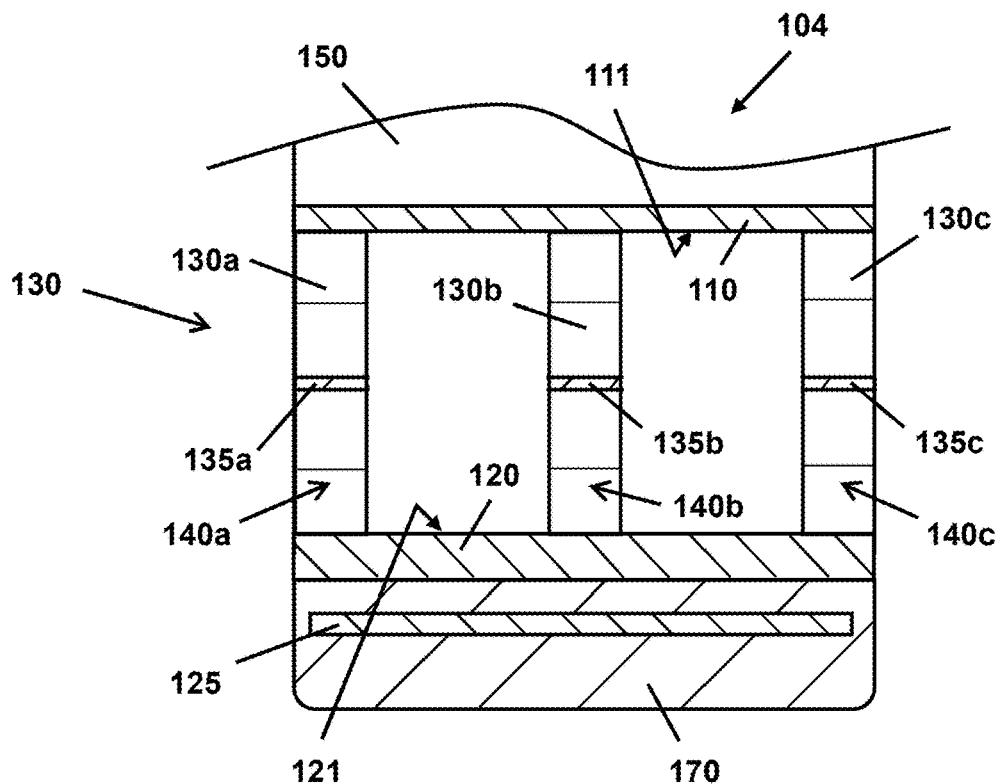
FIG. 18 is a partial cross-sectional view of a non-pneumatic tire known in the prior art showing a plurality of interconnected webs arranged in the axial direction of the tire.

FIG. 18 is a partial cross-sectional view of non-pneumatic tire 104 known in the prior art. Tire 104 is similar to non-pneumatic tire 100b (see FIG. 8) except for, rather than a single interconnected web 130, the interconnected web 130 of tire 104 includes a first interconnected web 130a formed by a plurality of first web elements 135a that define first polygonal openings 140a, a second interconnected web 130b formed by a plurality of first web elements 135b that define first polygonal openings 140b, and a third interconnected web 130c formed by a plurality of first web elements 135c that define first polygonal openings 140c. As described with respect to FIG. 9 and tire 100b, FIG. 19 similarly illustrates the potential for the band 125 of tire 104 to plastically deform at 205 when the tire 104 is loaded with extreme loads from a bump 200.

Figure 20:
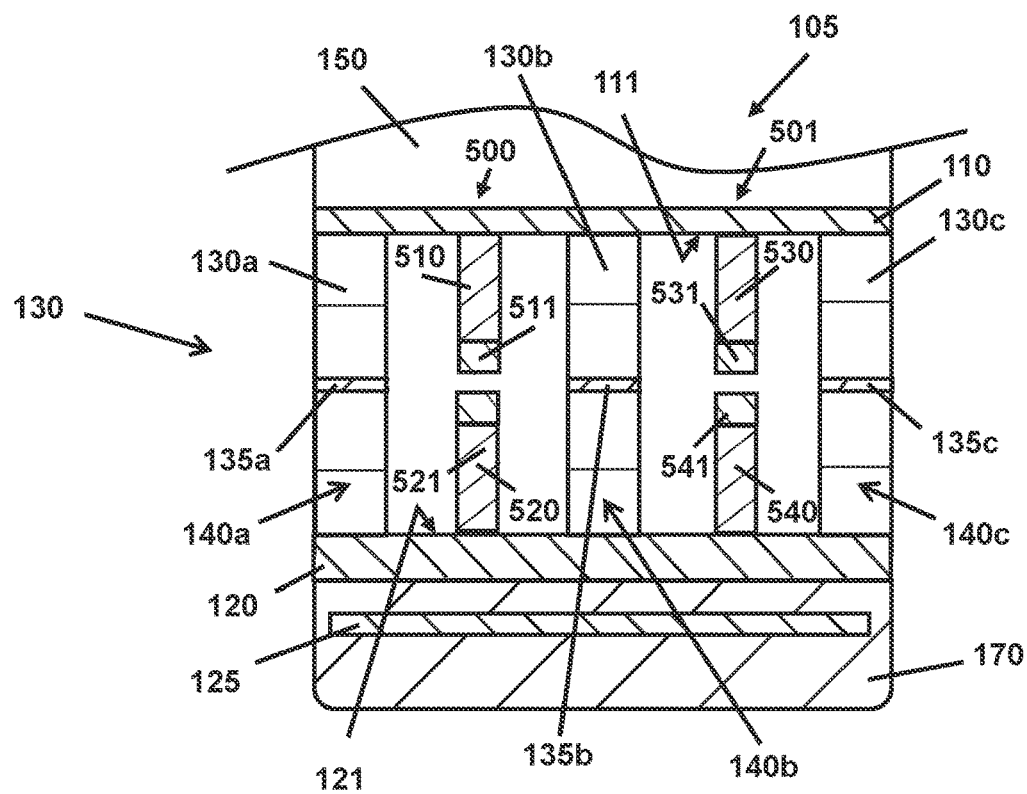
FIG. 20 is a partial cross-sectional view of another embodiment of a non-pneumatic tire having another exemplary bump stop.

FIG. 20 shows a partial cross-sectional view of non-pneumatic tire 105 with exemplary bump stops 500, 501. Bump stops 500, 501 are disposed along the width of the tire 104 relative to the rotation axis (see FIG. 3, axis 155) of the tire 105 laterally between the first and second interconnected webs 130a, 130b and the second and third interconnected webs 130b, 130c. Bump stop 500, disposed laterally between the first and second interconnected webs 130a, 130b, includes an inner member 510 extending radially outward from the annular inner ring 110 and an outer member 520 extending radially inward from the annular outer ring 120. The inner member 510 can be fixed to surface 111 of the inner ring 110 with a mechanical fastener, adhesive, welding, brazing, or a chemical bonding process, which may include heating, or other method of coupling. The outer member 520 can be fixed to surface 121 of the outer ring 120 in a same or similar manner. The inner member 510 and the outer member 520 extend a radial distance defined between the annular inner ring 110 and the annular outer ring 120. A gap is defined between a radially outer surface of the inner member 510 and a radially inner surface of the outer member 520. In the illustrated embodiment, the inner member 510 includes a compliant end 511 that defines the radially outer surface of the inner member 510, and the outer member 520 includes a compliant end 521 that defines the radially inner surface of the outer member 520.

Similarly, bump stop 501, positioned laterally between the first and second interconnected webs 130b, 130c, includes the same or similar features in the same or similar configuration as bump stop 500. For example, bump stop 501 includes inner member 530 with compliant end 531 defining the radially outer surface of the inner member 530, and outer member 540 with compliant end 541 defining the radially inner surface of the outer member 540. The radially outer surface faces the radially inner surface with a gap defined between the radially outer surface of the inner member 530 and the radially inner surface of the outer member 540. Bump stops 500, 501 on tire 105 are constructed of the same or similar materials for the same or similar reasons as described previously with respect to tire 101 with bumps stops 300, 301 shown in FIG. 10 and FIG. 11.

Figure 21:
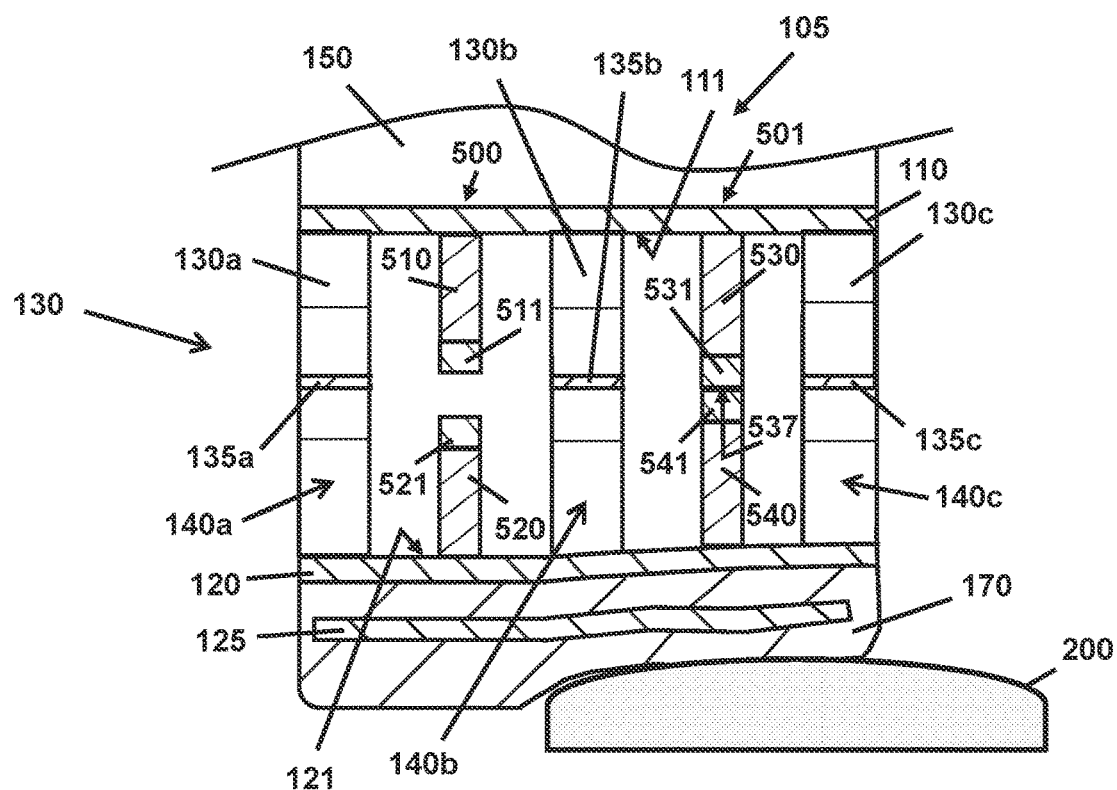
FIG. 21 is a partial cross-sectional view of the tire of FIG. 20 showing the bump stomp preventing the steel band mounted relative to the tread from undergoing plastic deformation when subjected to loading by a bump.

FIG. 21 shows the non-pneumatic tire 105 of FIG. 20 undergoing loading from bump 200. As shown on the right-hand side of FIG. 21, bump stop 501 prevents band 125 from being loaded above its elastic limit. In particular, the radially outer surface of the inner member 530 abuts the radially inner surface of the outer member 540 at interface 537. The inner member 530 and the outer member 540 are configured to prevent plastic deformation of the band 125, webbing 130 (or spokes or other support structure), and other components of the tire 105 (e.g., annular outer ring 120, interconnected web 130, and annular inner ring 110). Without intending to be bound by theory, the illustrated bump stop 501 limits deformation of the band 125 and other components of the tire 105 thereby prevents the band 125 and other components from being stressed beyond their respective elastic limits.

Figure 19:
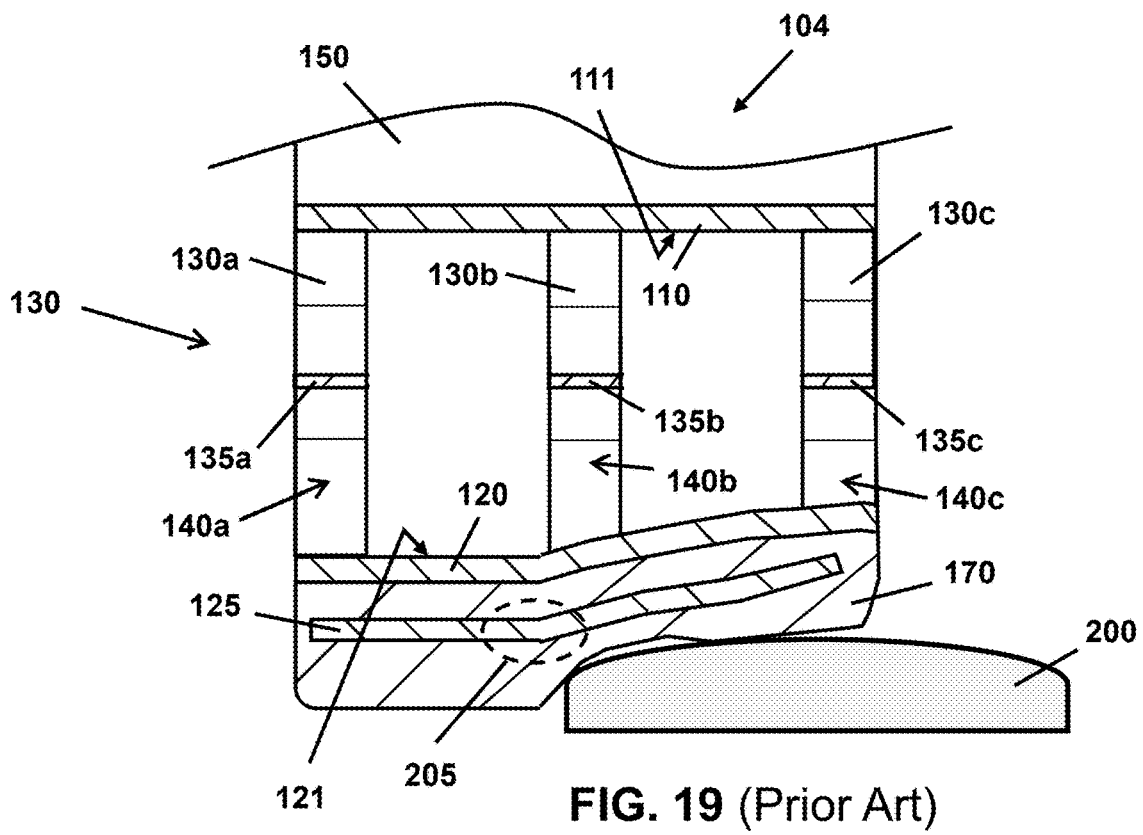
FIG. 19 is a partial cross-sectional view of the tire of FIG. 18 showing the steel band mounted relative to the tread undergoing plastic deformation as a result of loading imparted by a bump.

Comparing the tire 104 of FIG. 19 with the tire 105 of FIG. 21, the tire 104 in FIG. 19 undergoes larger deformation when subjected to loading by the bump 200 than the tire 105 in FIG. 21 because the bump stop 501 of tire 105 limits deformation when the radially outer surface of the inner member 530 abuts the radially inner surface of the outer member 540 at interface 537.

Figure 22:
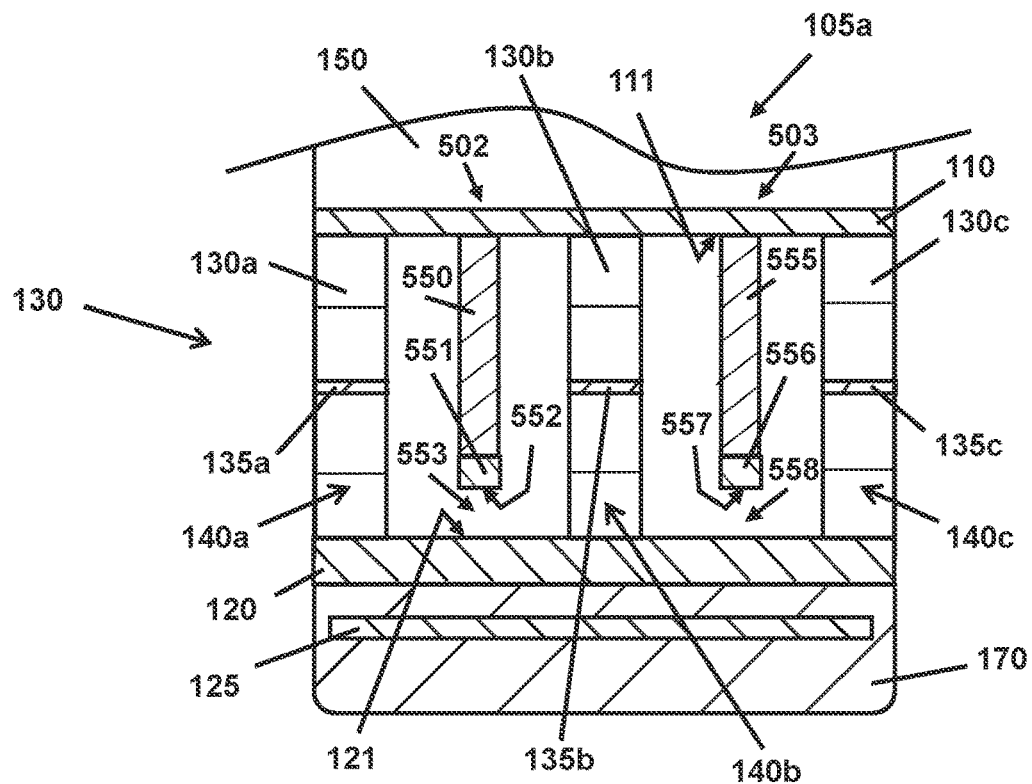
FIG. 22 is a partial cross-sectional view of yet another embodiment of a non-pneumatic tire including another exemplary bump stop.

FIGS. 22-25 show other example embodiments of bump stops employed with tires 105a, 105b, 105c, and 105d. In FIG. 22, tire 105a includes bump stops 502, 503. Bump stop 502 includes a planar inner member 550 extending from surface 111 of the annular inner ring 110. The planar inner member 550 includes a compliant end 551 defining a radially outer surface that is configured to abut surface 121 of the annular outer ring 120. Likewise, bump stop 503 includes a planar inner member 555 extending from surface 111 of the annular inner ring 110 and includes compliant end 556 defining a radially outer surface configured to abut surface 121 of the annular outer ring 120. Each of the radially outer surfaces is spaced from surface 121 of the annular outer ring 120 defining respective gaps. When subjected to loading, one or both of the gaps can close such that the respective radially outer surface abuts surface 121 of the annular outer ring 120, thereby restricting deformation of the band 125 and other components of the tire 105a. As noted, restricting deformation of the band 125, keeps stresses to which it is subjected less than the elastic limit of the component and avoids plastic deformation.

Figure 23:
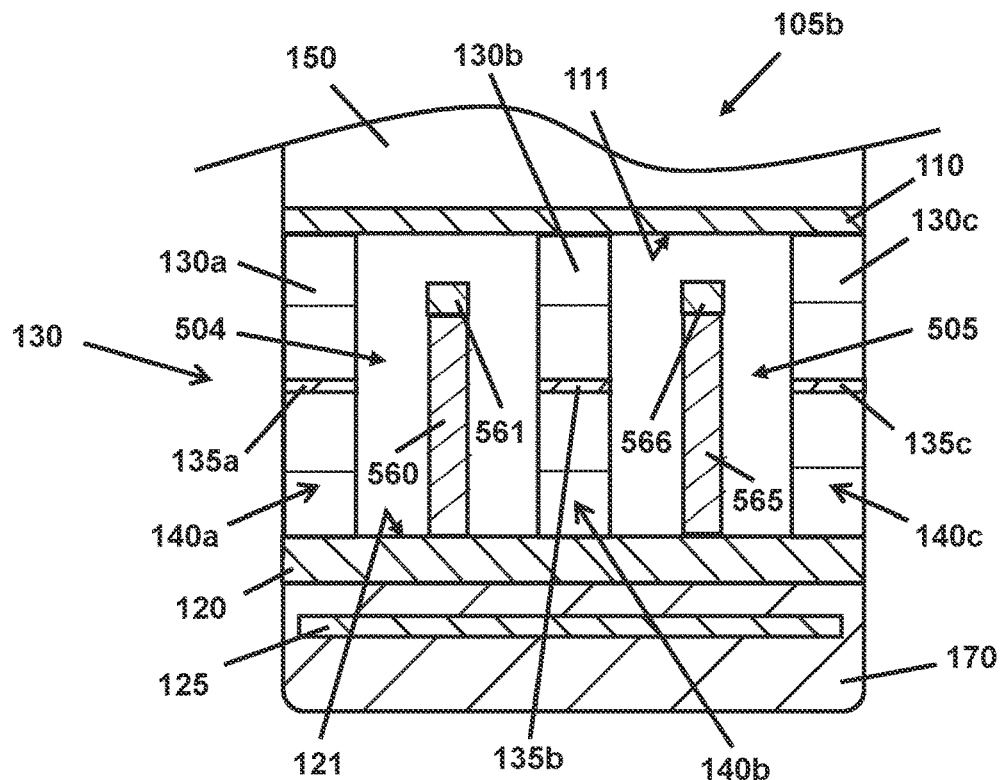
FIG. 23 is a partial cross-sectional view of still another embodiment of a non-pneumatic tire including another exemplary bump stop.

FIG. 23 shows tire 105b including bump stops 504, 505. As illustrated, bump stops 504, 505 respectively include planar outer members 560, 565 extending from surface 121 of the annular outer ring 120 and compliant ends 561, 566 defining radially inner surfaces configured to abut surface 111 of the annular inner ring 110. Each of the radially inner surfaces is spaced from surface 111 of the annular inner ring 110 defining respective gaps. In such a configuration, one or both bump stop 504, 505 would prevent plastic deformation of the band 125 and other components of the tire 105 by abutting surface 111 of the annular inner ring 110 when subjected to loading.

Figures 24, 25:
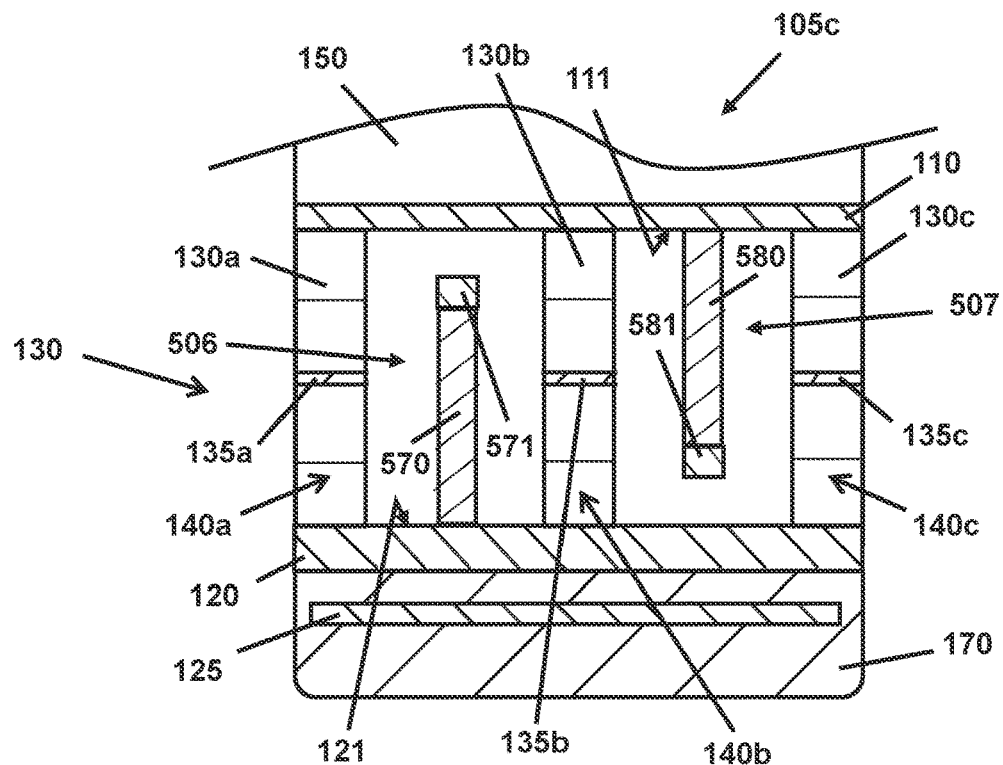
FIG. 24 is a partial cross-sectional view of another embodiment of a non-pneumatic tire including yet another exemplary bump stop.
FIG. 25 is a partial cross-sectional view of another embodiment of a non-pneumatic tire including still another exemplary bump stop.

FIG. 24 shows tire 105c including bump stops 506, 507. As illustrated, bump stop 506 includes planar outer member 570 extending from surface 121 of the annular outer ring 120 and compliant end 571 defining a radially inner surface spaced from surface 111 of the annular inner ring 110 defining a gap. The radially inner surface faces and is configured to abut surface 111 of the annular inner ring 110. Bump stops 507 includes planar inner member 580 extending from surface 111 of the annular inner ring 110 and compliant end 581 defining a radially outer surface spaced from surface 121 of the annular outer ring 120 defining a gap. The radially outer surface faces and is configured to abut surface 121 of the annular inner ring 120. In such a configuration, bump stop 506 would prevent plastic deformation of the band 125 and other components of the tire 105c by abutting surface 111 of the annular inner ring 110 when subjected to loading, and bump stop 507 would prevent plastic deformation of the band 125 and other components of the tire 105c by abutting surface 121 of the annular outer ring 120 when subjected to loading. Without intending to be bound by theory, such a configuration may help to distribute stress throughout the tire 105c such that a maximum stress experienced by any one or more components is reduced.

FIG. 25 tire 105d including bump stops 601, 602. As illustrated, bump stop 601 includes member 610 circumferentially disposed between surface 111 of the annular inner ring 110 and surface 121 of the annular outer ring 120 and axially disposed between the first and second interconnected webs 130a, 130b. The bump stop 601 includes an inner compliant end 613 defining a radially inner surface spaced from surface 111 of the annular inner ring 110 defining a gap. The radially inner surface faces and is configured to abut surface 111 of the annular inner ring 110. Bump stop 601 also includes an outer compliant end 611 defining a radially outer surface spaced from surface 121 of the annular outer ring 120 defining a gap. The radially outer surface faces and is configured to abut surface 121 of the annular outer ring 120.

Similarly, bump stop 602 includes member 620 circumferentially disposed between surface 111 of the annular inner ring 110 and surface 121 of the annular outer ring 120 and axially disposed between the second and third interconnected webs 130b, 130c. The bump stop 602 includes an inner compliant end 623 defining a radially inner surface spaced from surface 111 of the annular inner ring 110 defining a gap. The radially inner surface faces and is configured to abut surface 111 of the annular inner ring 110. Bump stop 602 also includes an outer compliant end 621 defining a radially outer surface spaced from surface 121 of the annular outer ring 120 defining a gap. The radially outer surface faces and is configured to abut surface 121 of the annular outer ring 120. In such a configuration, one or both bump stops 601, 602 would prevent plastic deformation of the band 125 and other components of the tire 105d by abutting surface 111 of the annular inner ring 110 and surface 121 of the annular outer ring 120 when subjected to loading.

In the illustrated embodiment, bump stops 601, 602 are floating bump stomps. By floating, it is meant that bump stops 601, 602 are structurally unsecured and instead radially and axially float. As shown, bump stops 601, 602 radially float within the space defined between the outer surface 111 of the annular inner ring 110 and the inner surface 121 of the annular outer ring 120. Bump stop 601 axially floats within the space defined between the first and second interconnected webs 130a, 130b, and bump stop 602 axially floats within the space define between the second and third interconnected webs 130b, 130c.

In other embodiments (not shown), one or both bump stops 601, 602 may be radially floating and axially secured, radially secured and axially floating, or radially and axially secured. For example, a radially secured embodiment of bump stop 601 may include on or more supports extending from the bump stop 601 to at least one of the outer surface 111 of the inner annular ring 110 and the inner surface 121 of the annular outer ring 120. An axially secured embodiment of bump stop 601 may include one or more supports extending from the bump stop 601 to at least one of the first and second interconnected webs 130a, 130b.

Accordingly, unless otherwise noted, the features described herein with respect to the various types of non-pneumatic tires may be employed alone or in combination with each other to provide one or more bump stops for controlling, reducing, eliminating, and preventing plastic deformation of the non-pneumatic tires.

Figure 26:
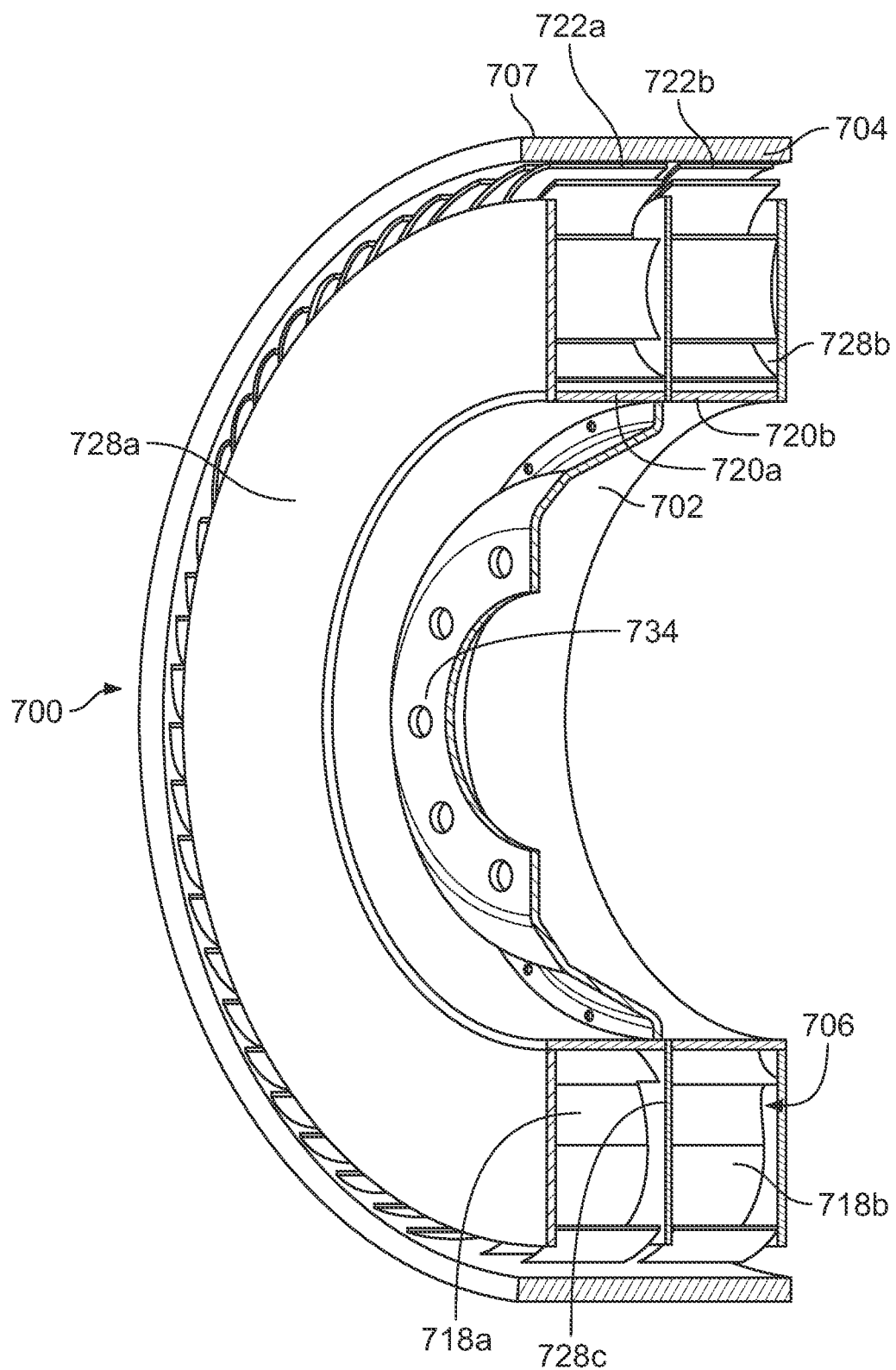
FIG. 26 is a perspective cutaway view of one embodiment of a non-pneumatic tire.
Figure 27:
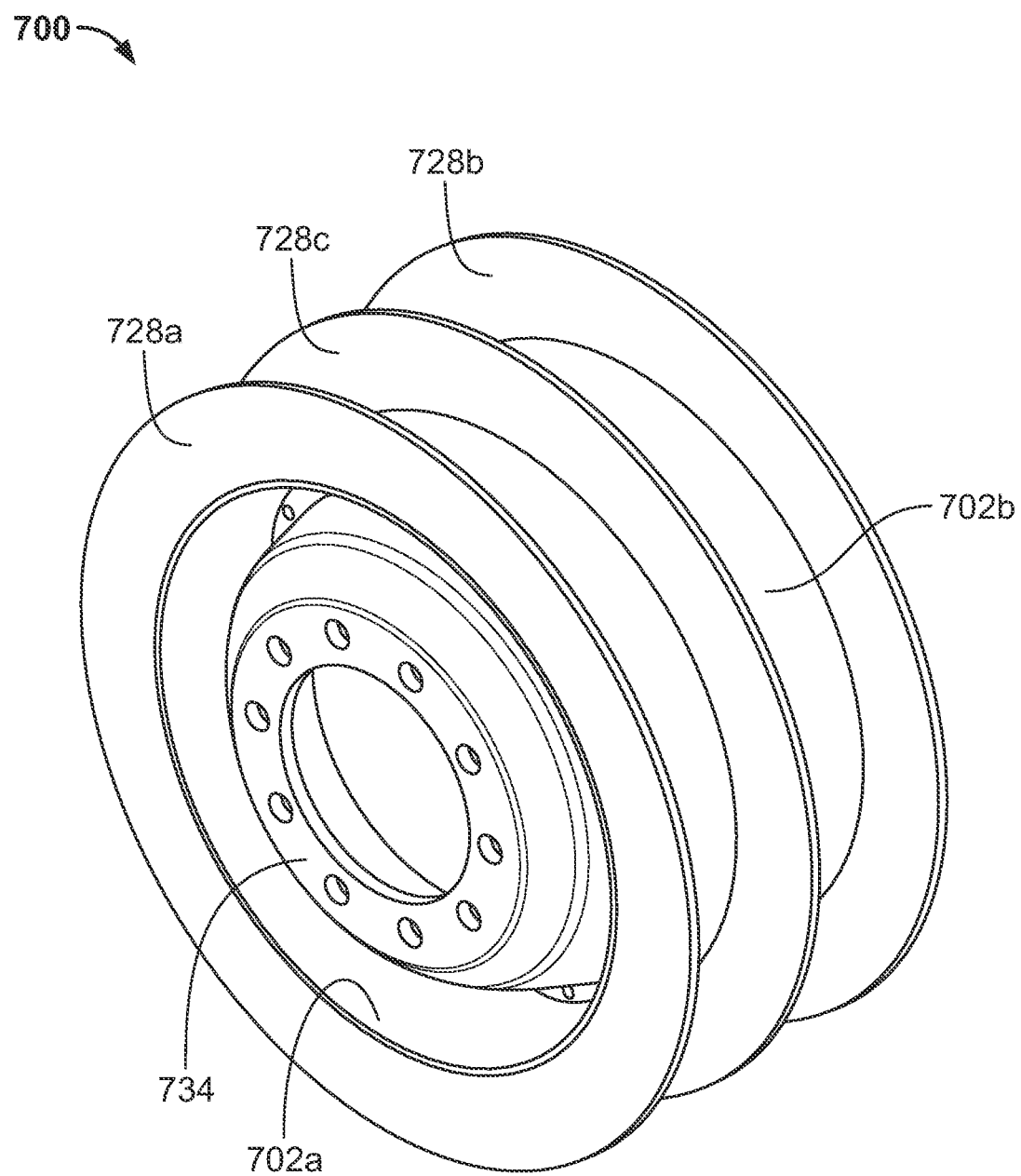
FIG. 27 is a perspective view of the non-pneumatic tire of FIG. 26, with an outer ring and tread removed for illustrative purposes.
Figure 28:
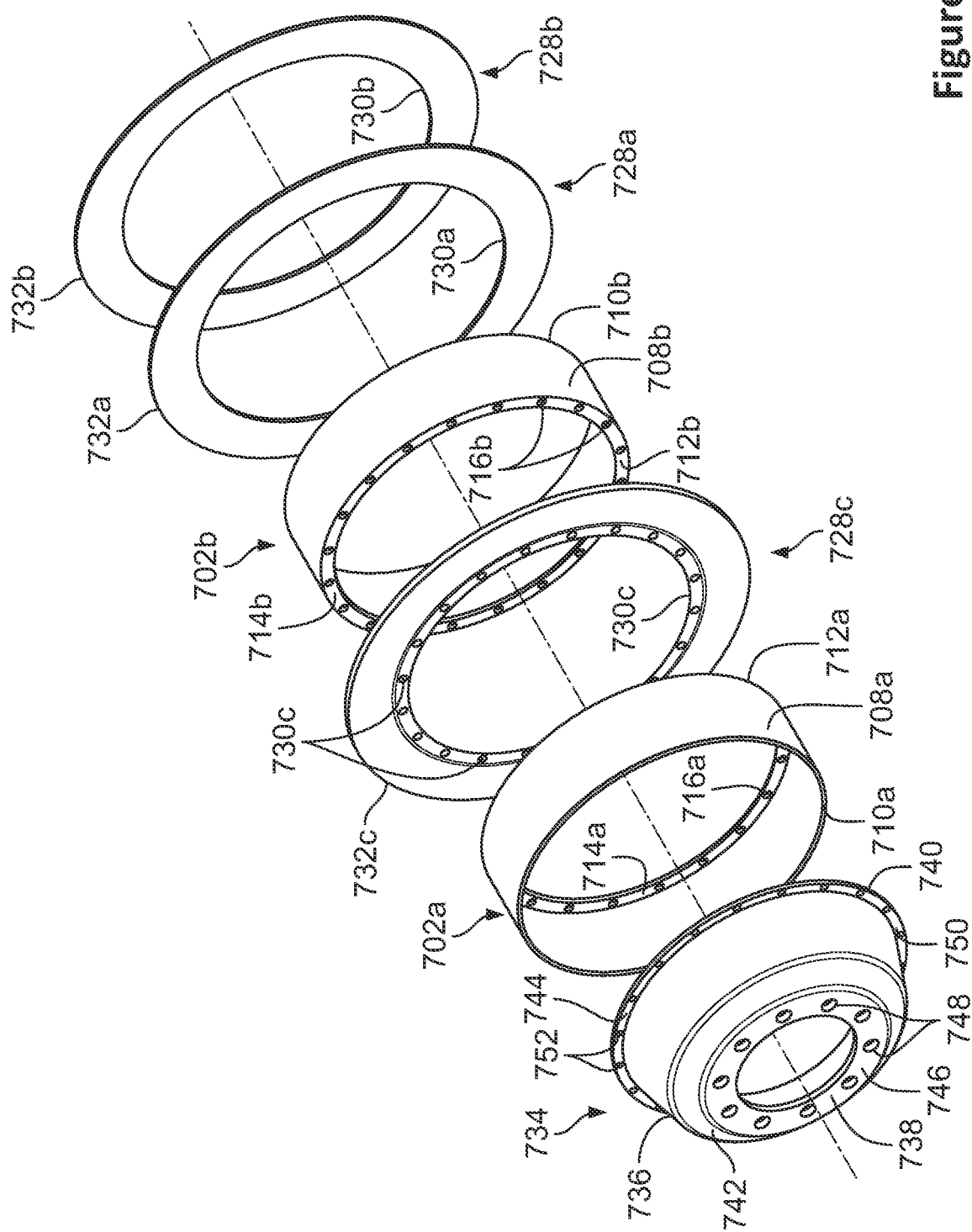
FIG. 28 is a exploded perspective view of FIG. 27.

FIGS. 26-28 show one embodiment of a non-pneumatic tire 700. The non-pneumatic tire 700 includes a lower ring 702 having a first diameter, and an upper ring 704 having a second diameter greater than the first diameter. The upper ring 704 is substantially coaxial with the lower ring 702. Support structure 706 extends between and connects the lower ring 702 to the upper ring 704.

In the illustrated embodiment the upper ring 704 is a single component. In an alternative embodiment the upper ring may include two or more discrete parts. A circumferential tread 707 is disposed about the upper ring 704. The tread 707 may include tread elements such as grooves, ribs, blocks, lugs, sipes, studs, and other elements. A shear band or other shear element or reinforcement structure (not shown) may be disposed between the upper ring 704 and the tread 707. In an alternative embodiment, the separate tread may be omitted and, instead, tread elements may be formed directly on the upper ring.

The lower ring 702 includes a discrete first part 702a and a discrete second part 702b. As best seen in FIG. 28 the first part 702a includes a main cylindrical portion 708a having a first end 710a and a second end 712a. A flange 714a is provided at the second end 712a. The flange 714a extends radially downward from the second end 712a. In an alternative embodiment the flange may be axially offset from the second end. In another alternative embodiment the flange may extend radially upward. The flange 714a includes a plurality of fastener apertures 716a. The fastener apertures 716a are equally spaced from one another circumferentially about the flange 714a.

In the illustrated embodiment, the first end 710a of the main cylindrical portion 708a does not have a flange. In an alternative embodiment, however, the first end may have a flange similar to the flange 714a. The flange of the first end may likewise include apertures.

The second part 702b also includes a main cylindrical portion 708b that extends between a first end 710b and a second end 712b. A flange 714b is provided at the second end 712b. The flange 714b of the second part 702b extends radially downward from the second end 712b. In an alternative embodiment the flange may be axially offset from the second end. In another alternative embodiment the flange may extend radially upward. The flange 714b includes a plurality of fastener apertures 716b. The fastener apertures 716b are equally spaced from one another circumferentially about the flange 714b. The spacing of the fastener apertures 714b of the second part 702b is substantially equal to the spacing of the fastener apertures 716a of the first part 702a.

In the illustrated embodiment, the first end 710b of the main cylindrical portion 708b does not have a flange. In an alternative embodiment, however, the first end may have a flange similar to the flange 714b. The flange of the first end may likewise include apertures.

In the illustrated embodiment, the first part 702a of the lower ring 702 is substantially identical to the second part 702b of the lower ring 702. In an alternative embodiment, the first and second parts of the lower ring may be different from one another. For example, the first part of the lower ring may include a single flange while the second part of the lower ring may include two flanges. As another example, the flange of the first ring may be provided at the respective second end while the flange of the second ring may be axially offset from the respective second end.

In the illustrated embodiment, the support structure 706 includes a plurality of spokes 718. The plurality of spokes 718 are arranged into a first spoke group 718a and a second spoke group 718b. Each spoke of the first spoke group 718a has a first end 720a attached to the first part 702a of the lower ring 702 and a second end 722a attached to the upper ring 704. Each spoke of the second spoke group 702b has a first end 720b attached to the second part 702b of the lower ring 702 and a second end 722b attached to the upper ring 704. Non-limiting examples of how the spoke ends 720, 722 may be attached to the lower ring 702 and the upper ring 704 include adhesive, molding, or mechanical fasteners. Alternatively, the spokes 718 and at least one of the lower ring 702 and the upper ring 704 may be a single, unitary construction.

In the illustrated embodiment the first end 720 of the spokes 718 are attached directly to the lower ring 702 and the second end 722 of the spoke 718 are attached directly to the upper ring 704. In an alternative embodiment the first end 720 or the second end 722 of the spokes 718 may be indirectly attached to the lower ring 702 and the upper ring 704, respectively. For example, the spoke ends 720, 722 may be attached to a respective ring 702, 704 by a damper, spacer, or any other desired structure.

In the illustrated embodiment the spokes 718 are substantially C-shaped. In alternative embodiments the spokes may be provided as any desired shape. For example, the spokes may be substantially U-shaped or, referring to FIG. 29A, the spokes 719 may be substantially V-shaped. Compared to the U-shaped spoke, the V-shaped spoke has a more pronounced point between the lower ring 702 and the upper ring 704. As another example, referring to FIG. 29B, the spokes 721 may be serpentine shaped with two or more bends. In other example embodiments the spokes may be any desired shape (e.g., straight spoke). The shape of the spokes may be selected to provide desired performance characteristics. In other alternative embodiments the non-pneumatic tire may be provided with a combination of spokes having different shapes.

Figures 29A, 29B, 29C:
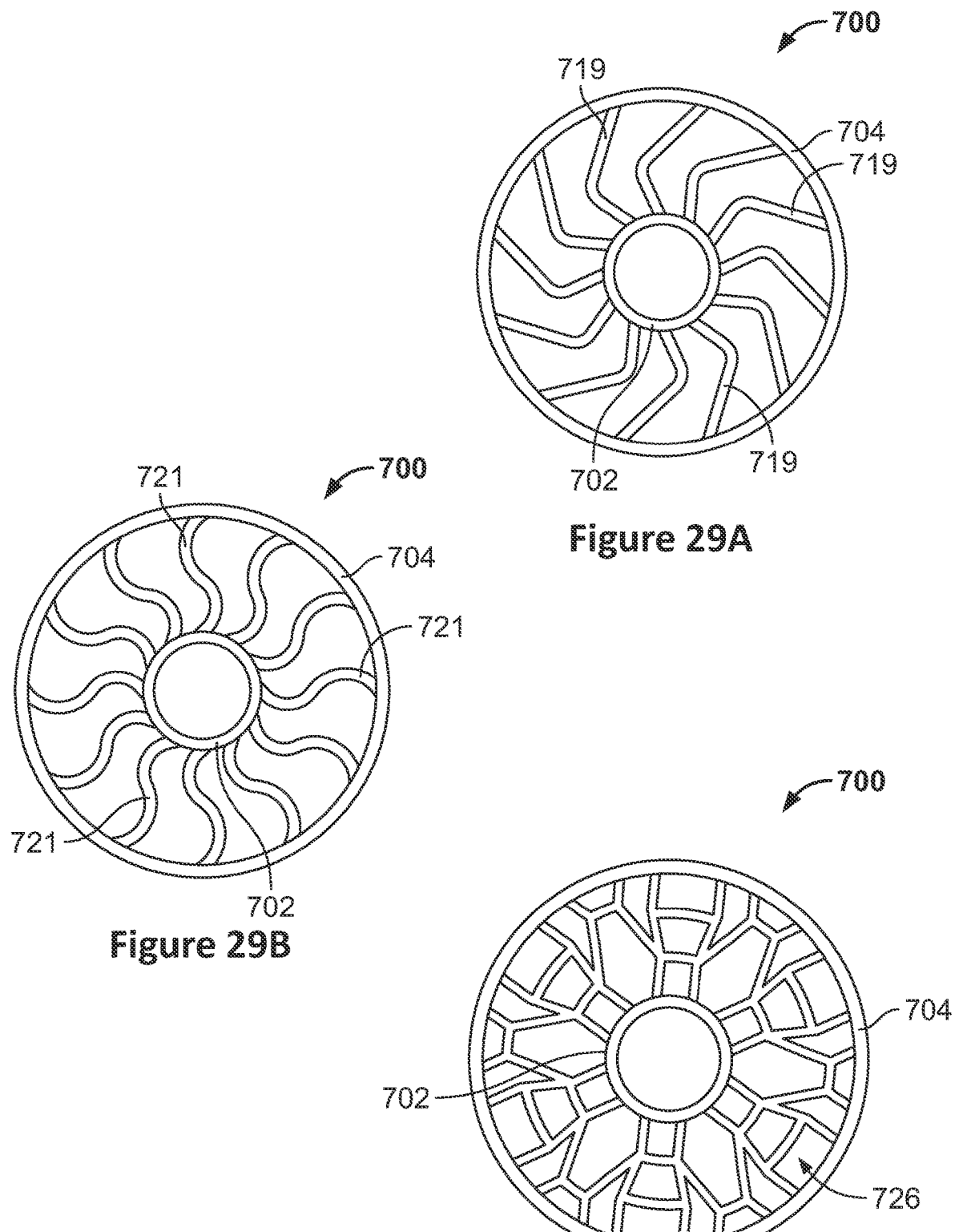
FIGS. 29A-29C are front views of non-pneumatic tires having alternative support structure with part of the non-pneumatic tire being hidden to show the support structure.

Referring to FIG. 29C, in another alternative embodiment, the support structure may be provided as webbing 726. The specific geometry of the webbing 726 shown in FIG. 29C is merely exemplary. In other alternative embodiments the webbing may be provided with any desired geometry.

The non-pneumatic 700 includes a first bump stop 728a, a second bump stop 728b, and a third bump stop 726c. The first bump stop 728a is provided at the first end 710a of the main cylindrical portion 708a of the first part 702a of the lower ring 702. The first bump stop 728a includes a lower end 730a that defines a first diameter and an upper end 732a that defines a second diameter. The first diameter is substantially equal to a diameter of the main cylindrical portion 708a of the first part 702a of the lower ring 702. The second diameter is less than a diameter of the upper ring 704. The first bump stop 728a may be attached to the first part 702a using adhesive, molding, mechanical fasteners, or any other desired attachment method. Alternatively, the first bump stop 728a and the first part 702a may be a single, unitary construction.

The second bump stop 728b is provided at the first end 710b of the main cylindrical portion 708b of the second part 708b of the lower ring 702. The second bump stop 728b includes a lower end 730b that defines a first diameter and an upper end 732b that defines a second diameter. The first diameter is substantially equal to the diameter of the main cylindrical portion 708b of the second part 702b of the lower ring 702. The second diameter is less than the diameter of the upper ring 704. The second bump stop 728b may be attached to the second part 702b using adhesive, molding, mechanical fasteners, or any other desired attachment method. Alternatively, the second bump stop 728b and the second part 702b may be a single, unitary construction.

The third bump stop 728c is provided on the lower ring 12 axially between the first bump stop 728a and the second bump stop 728b. The third bump stop 728c includes a lower end 730c that defines a first diameter and an upper end 732c that defines a second diameter. The first diameter is less than the diameter of the main cylindrical portions 708a, 708b of the first and second parts 702a, 702b, respectively, of the lower ring 702. The second diameter is less than the diameter of the upper ring 704. A portion of the third bump stop 728c is provided with a plurality of fastener apertures 731. The fastener apertures 731 are equally spaced from one another circumferentially about the third bump stop 728c. The spacing of the fastener apertures 731 of the third bump stop 728c is substantially equal to the spacing of the fastener apertures 716a, 716b on the flanges 714a, 714b, respectively.

A portion of the third bump stop 728c is disposed between the flanges 714a, 714b of the first and second parts 702a, 702b, respectively of the lower ring 702 to secure the third bump stop 728c to the lower ring 702. Specifically, fasteners received in the fasteners apertures 714a, 714 of the first and second parts 702a, 702b, respectively, and the fastener apertures 731 of the third bump stop 728c secure the first and second parts 702a, 702b together and clamp the portion of the third bump stop 728c therebetween.

Thus, in the illustrated embodiment, the first, second, and third bump stops 728a, 728b, 728c extend from the lower ring 702 toward the upper ring 704 but do not engage the upper ring 704 when the non-pneumatic tire 700 is experiencing normal loading. In an alternative embodiment, the first, second, and third bump stops extend from the upper ring toward the lower ring but do not engage the lower ring when the non-pneumatic tire is experiencing normal loading.

According to this alternative embodiment, the first diameter of the first bump stop is greater than the diameter of the main cylindrical portion of the first part of the lower ring and the second diameter of the first bump stop is substantially equal to the diameter of the upper ring. Additionally, the first diameter of the second bump stop is greater than the diameter of the main cylindrical portion of the second part of the lower ring and the second diameter of the second bump stop is substantially equal to the diameter of the upper ring. Further, the first diameter of the third bump stop is greater than the diameter of the main cylindrical portion of the first and second parts respectively, of the lower ring and the second diameter of the third bump stop is greater than the diameter of the upper ring. According to this alternative embodiment, the upper ring includes a discrete first part and a discrete second part and a portion of the third bump stop is clamped between the first and second parts. In another alternative embodiment, the upper ring may include a first part and a discrete second part and the lower ring may be a single piece.

In yet another alternative embodiment the non-pneumatic tire may include any combination of connections between the bump stops and the rings (e.g., first and second bump stops extend from the lower ring and the third bump stop extends from the upper ring). In yet another alternative embodiment, the bump stops may fully extend between the lower ring and the upper ring. In still yet another alternative embodiment, the non-pneumatic tire may include split bump stops (i.e., bump stops that extend from both the lower ring and the upper ring toward one another and are axially aligned).

In the illustrated embodiment the lower ring 702 is shown as being attached to a hub 734. The hub 734 has a main portion 736 that extends axially between a first end 738 and a second end 740. In the illustrated embodiment, the main portion 736 tapers radially upward in an axial direction from the first end 738 to the second end 740. The main portion 736 has a first tapered portion 742 and a second tapered portion 744. The taper angle of the first tapered portion 742 is greater than the taper angle of the second tapered portion 744. In an alternative embodiment, the main portion may taper radially downward, may have a constant taper (i.e., not having two different taper angles), or may be free from tapering.

A first flange 746 is provided at the first end 738. The first flange 746 extends radially downward from the first end 738. In an alternative embodiment the flange may be axially offset from the first end or extend radially upward. The first flange 746 includes a plurality of lug apertures 748. The lug apertures 748 are equally spaced from one another circumferentially about the first flange 746.

A second flange 750 is provided at the second end 740. The second flange 750 extends radially upward from the second end 740. In an alternative embodiment the second flange may be axially offset from the second end or extend radially downward. The second flange 750 includes a plurality of fastener apertures 752. The fastener apertures 752 are equally spaced from one another circumferentially about the second flange 750.

The spacing of the fastener apertures 752 on the second flange 750 of the hub 734 is equal to the spacing of the fastener apertures 714a, 714b on the first and second parts 702a, 702b, respectively of the lower ring 702. Thus, the fasteners that are used to connect the first and second parts 702a, 702b of the lower ring 702 together may be received in the fastener apertures 752 of the hub 734 to secure the hub 732 to the lower ring 732. In an alternative embodiment the spacing of the fastener apertures on the hub may be different from the spacing of the fastener apertures on the lower ring.

The hub 734 may be used to attach the non-pneumatic tire 700 to a vehicle. For example, the lug apertures 748 may receive fasteners that attach the non-pneumatic tire 700 to the vehicle. In an alternative embodiment the hub may be omitted.

Figure 30:
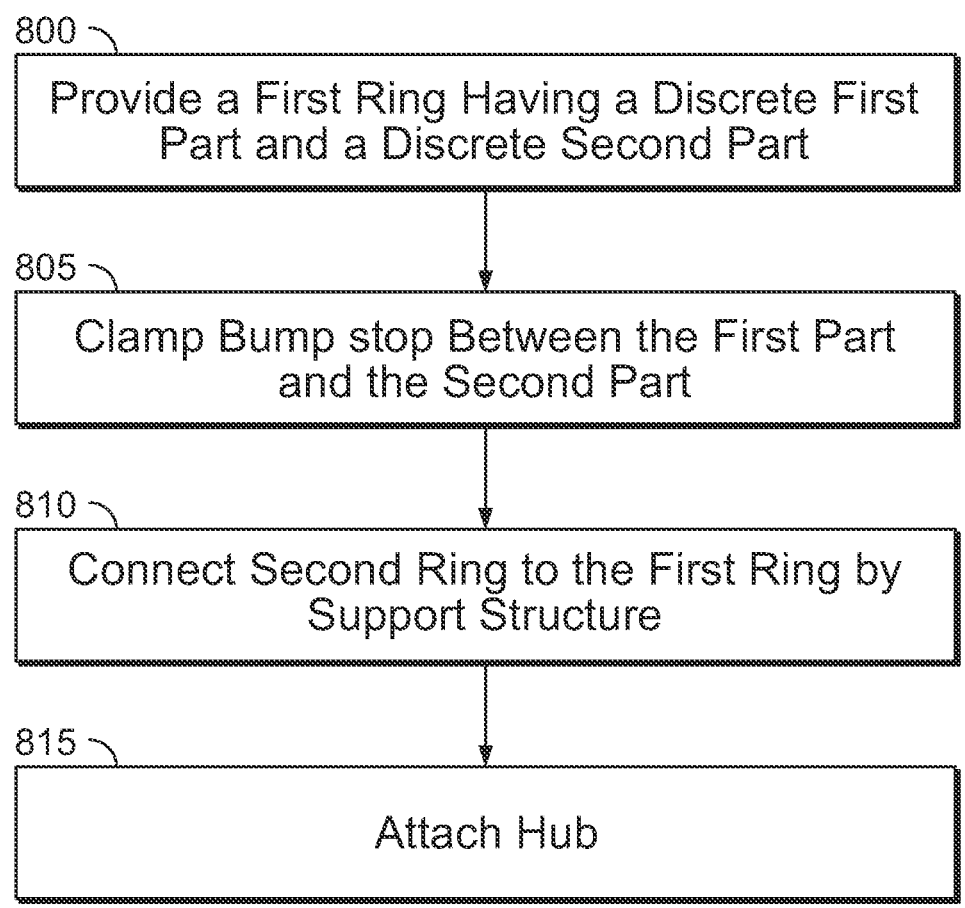
FIG. 30 is a flow chart showing an exemplary process of assembling a non-pneumatic tire.

Referring to FIG. 30, a method of assembling the non-pneumatic tire 700 of FIGS. 26-28 will now be explained. At 800 a first ring is provided, the first ring having a discrete first part and a discrete second part. Depending on the configuration of the non-pneumatic tire, the first ring may be the lower ring or the upper ring. At 805, a bump stop is clamped between the first part and the second part of the first ring. At 810, a second ring is connected to the first ring by support structure. Depending on the configuration of the tire, if the first ring is the lower ring then the second ring is the upper ring and, conversely, if the first ring is the upper ring then the second ring is the lower ring. At 815 a hub is attached and assembly of the non-pneumatic tire is complete.

The method of FIG. 30 may simplify the process of manufacturing a non-pneumatic tire having a central bump stop. Specifically, the ability to clamp the bump stop between the first and second parts of the first ring may simplify the manufacturing process considerably. The discussion of providing additional bump stops has been omitted from the method. Additional bump stops, however, may be provided using conventional methods (e.g., attaching bump stops to the rings using adhesive). The exact method of FIG. 30 is merely exemplary. In other alternative embodiments the specific steps may take place in any desired order, or may include a fewer or greater number of steps.

Figure 31:
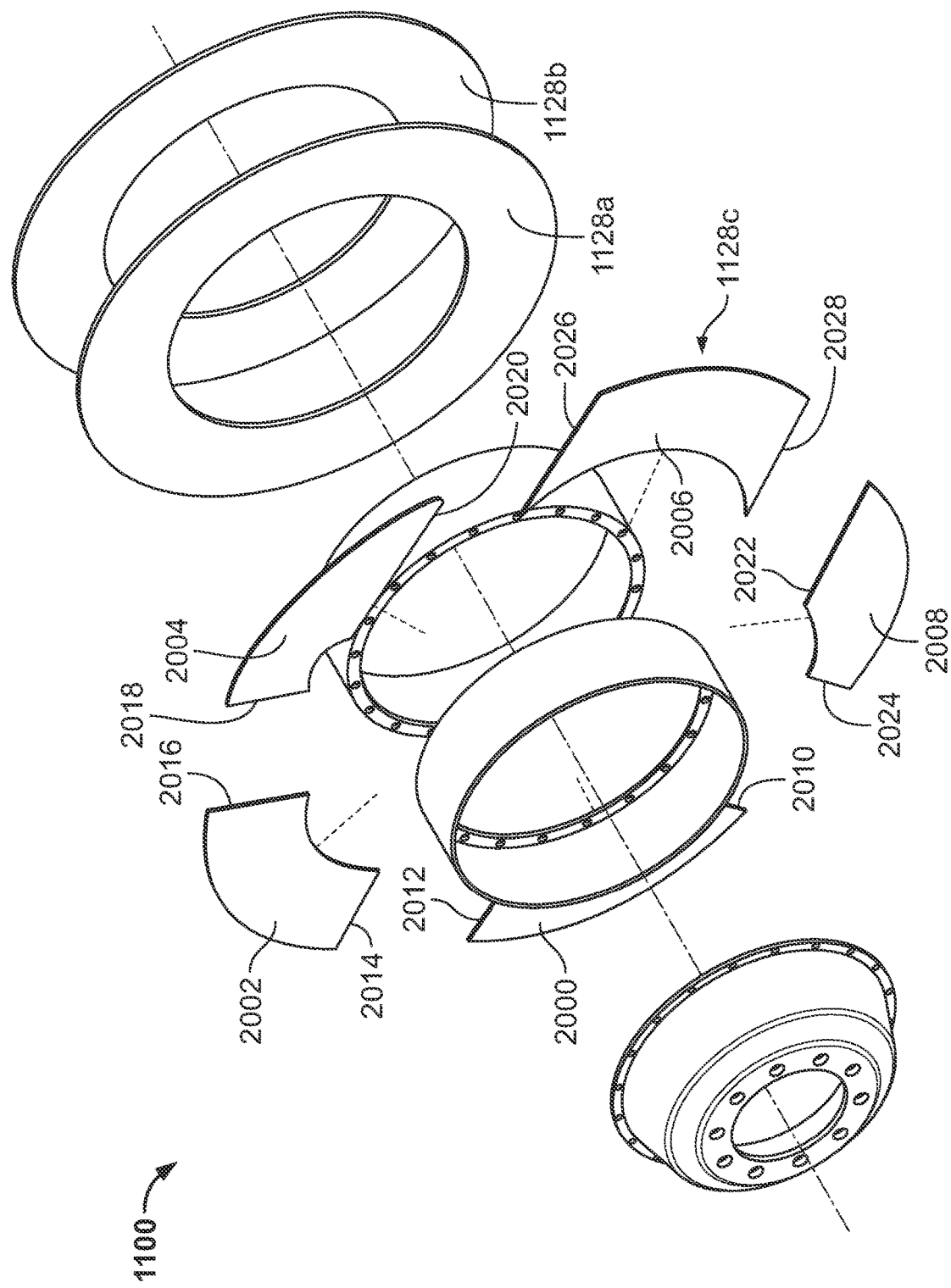
FIG. 31 is an exploded perspective view of an alternative embodiment of a non-pneumatic tire.
Figure 31A:
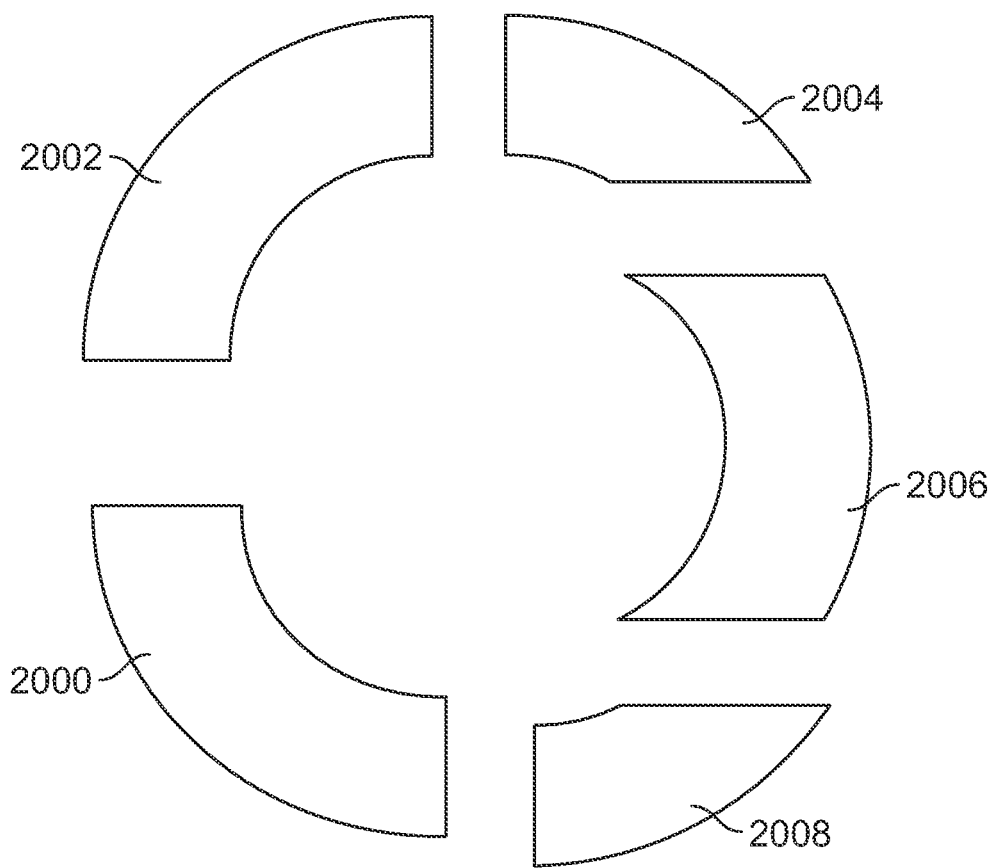
FIG. 31A is a plan view of part of the non-pneumatic tire of FIG. 31.

Referring to FIGS. 31 and 31A, an alternative embodiment of a non-pneumatic tire 1100 is shown. The embodiment of the non-pneumatic tire 1100 of FIGS. 6 and 6A is substantially similar to the embodiment of the non-pneumatic tire 700 of FIGS. 26-28. Accordingly, only the differences between the embodiments will be discussed in detail. Like features will be identified by like numerals increased by a factor of 1000.

Similar to the embodiment of the non-pneumatic tire 700 of FIGS. 26-28, the non-pneumatic tire 1100 of FIGS. 31 and 31A includes a first bump stop 1128a, a second bump stop 1128b, and a third bump stop 1128c. Unlike, however, the non-pneumatic tire 700 of FIGS. 26-28, the third bump stop 1128c of the non-pneumatic tire 1100 of FIGS. 31 and 31A includes multiple discrete pieces. Specifically, the third bump stop 1128c includes a first piece 2000, a second piece 2002, a third piece 2004, a fourth piece 2006, and a fifth piece 2008.

The first piece 2000 and the second piece 2002 each make up approximately 25% of the third bump stop 1128c. The first piece 2000 extends circumferentially between a first end 2010 and a second end 2012. When the non-pneumatic tire 1100 is assembled, the first end 2010 and the second end 2012 each extend substantially parallel with a radial direction of the non-pneumatic tire 1100. The second piece 2002 extends circumferentially between a first end 2014 and a second end 2016. When the non-pneumatic tire 1100 is assembled, the first end 2014 and the second end 2016 each extend substantially parallel with a radial direction of the non-pneumatic tire 1100.

The third piece 2004 and the fifth piece 2008 each make up approximately 10% of the third bump stop 1128c. The third piece 2004 extends circumferentially between a first end 2018 and a second end 2020. When the non-pneumatic tire 1100 is assembled, the first end 2018 extends substantially parallel with a radial direction of the non-pneumatic tire 1100 and the second end 2020 extends substantially perpendicular to the first end 2018. The fifth piece 2008 extends circumferentially between a first end 2022 and a second end 2024. When the non-pneumatic tire 1100 is assembled, the second end 2024 extends substantially parallel with a radial direction of the non-pneumatic tire 1100 and the first end 2022 extends substantially perpendicular to the second end 2024.

The fourth piece 2006 makes up approximately 30% of the third bump stop 1128c. The fourth piece 2006 extends circumferentially between a first end 2026 and a second end 2028. When the non-pneumatic tire 1100 is assembled, the first and second ends 2026, 2028 each extend transverse to a radial direction of the non-pneumatic tire 1100 and substantially parallel with one another.

In the illustrated embodiment, when the non-pneumatic tire 1100 is assembled, the ends of adjacent pieces contact one another but are not connected. In an alternative embodiment, the ends of adjacent pieces contact one another and are connected by adhesive, bonding, or any other desired connection method. In another alternative embodiment the ends of adjacent pieces are spaced from each other.

While FIG. 31 shows a bump stop 1128c constructed of five pieces, in an alternative embodiment, the bump stop may be constructed of four or fewer pieces. Alternatively, the bump stop may be constructed of six or more pieces. The illustrated geometry of the bump stop pieces is merely exemplary. The ends may extend at different angles than those shown. Additionally, the specific percentage that each piece makes up of the total bump stop is merely exemplary. The percentage of the total bump stop made up by any single piece may be any desired value.

Figure 32:
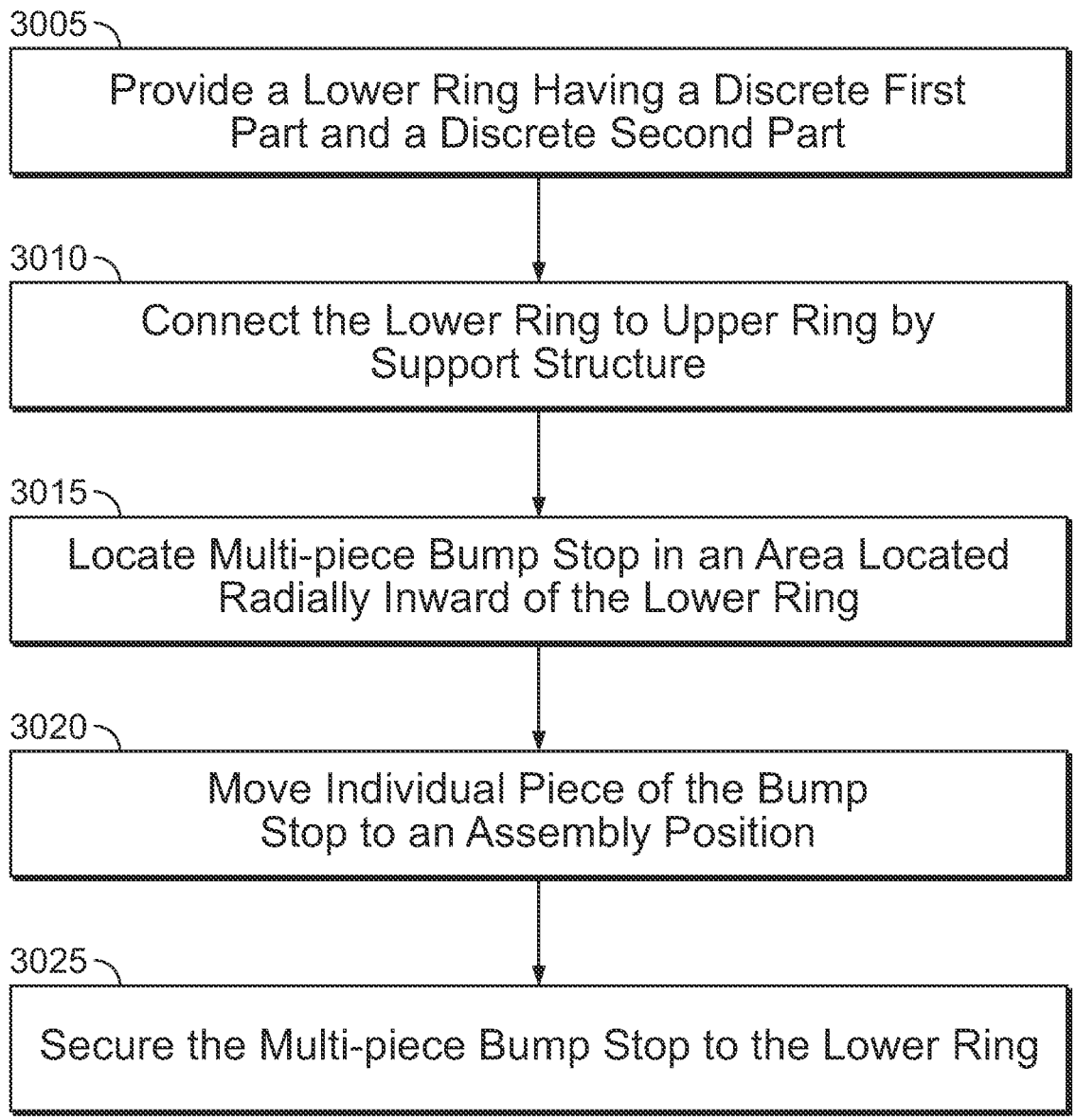
FIG. 32 is a flow chart showing another exemplary process of assembling a non-pneumatic tire.

Referring to FIG. 32, a method of assembling the non-pneumatic tire 1100 of FIG. 31 will now be described. At 3005 a lower ring is provided, the lower ring having a discrete first part and a discrete second part. At 3010, with the first part and the second part of the lower ring still being free from connection to one another, the lower ring is connected to the upper ring by support structure such that a small gap is provided between the first part and the second part. In an alternative embodiment, prior to connecting the lower ring to the upper ring with the third bump stop 1128c support structure, the first part and the second part may be partially connected, but still spaced apart from another such that a small gap is provided between the first part and the second part. At 3015, the multi-piece bump stop is located in an area located radially downward of the first ring. At 3020, the individual pieces of the bump stop are moved to an assembly position by moving the pieces through the gap formed at 3010 radially upward toward the second ring. At 3025 the multi-piece bump stop is secured to the lower ring. The bump stop may be secured to the lower ring by clamping the pieces of the bump stop between the first and second parts of the lower ring.

The method of FIG. 32 may simplify the process of manufacturing a non-pneumatic tire having a central bump stop. Specifically, the multi-piece bump stop, the specific shapes of the pieces of the multi-piece bump stop, and the ability to move the pieces of the bump stop radially upward to an assembly position may simplify the manufacturing process considerably. The discussion of providing additional bump stops has been omitted from the method. Additional bump stops, however, may be provided using conventional methods (e.g., attaching bump stops to the rings using adhesive). The exact method of FIG. 32 is merely exemplary. In other alternative embodiments the specific steps may take place in any desired order, or may include a fewer or greater number of steps.

In a first embodiment, based on the above detailed description, a non-pneumatic tire includes a lower ring having a first diameter, and an upper ring having a second diameter greater than the first diameter, the upper ring being substantially coaxial with the lower ring. In this embodiment, the non-pneumatic tire further includes a support structure connecting the lower ring to the upper ring and a bump stop. One of the lower ring and the upper ring includes a discrete first part and a discrete second part. The bump stop is secured between the first part and the second part and extends radially toward the one other of the lower ring and the upper ring.

In this first embodiment, the lower ring may optionally include the first part and the second part, with the bump stop being clamped between the first part and the second part of the lower ring and extending radially toward the upper ring. Alternatively, the upper ring may optionally include the first part and the second part, with the bump stop being clamped between the first part and the second part of the upper ring and extending radially toward the lower ring.

In this first embodiment, the bump stop may be a single piece. Alternatively, the bump stop may be multiple discrete pieces. For example, the bump stop may include a first piece, a second piece, a third piece, a fourth piece, and a fifth piece, with the first piece making up approximately 25% of the bump stop, the second piece making up approximately 25% of the bump stop, the third piece making up approximately 10% of the bump stop, the fourth piece making up approximately 30% of the bump stop, and the fifth piece making up approximately 10% of the bump stop.

In this first embodiment, the support structure may be a plurality of spokes. The plurality of spokes may be arranged into a first spoke group and a second spoke group, with the bump stop being axially located between the first spoke group and the second spoke group.

Alternatively, in this first embodiment, the support structure may be a webbing.

This first embodiment may further include a hub secured to the lower ring.

Additionally, based on the above detailed description, a first embodiment of a method of assembling a non-pneumatic tire includes the steps of providing a first ring having a first part and a discrete second part, clamping a bump stop between the first part and the second part, and connecting a second ring to the first ring by support structure.

In this first embodiment of a method, the first ring may have a first diameter and the second ring may have a second diameter that is greater than the first diameter. Alternatively, the first ring may have a first diameter and the second ring may have a second diameter that is less than the first diameter.

In this first embodiment of a method, the support structure may include a plurality of spokes, with the spokes being arranged into a first spoke group and a second spoke group, and with the bump stop being located axially between the first spoke group and the second spoke group.

This first embodiment may also optionally include the step of attaching a hub to one of the first ring and the second ring.

Additionally, based on the above detailed description, a second embodiment of a method of assembling a non-pneumatic tire comprising the steps of providing a first ring having a first diameter and a second ring having a second diameter that is greater than the first diameter, and connecting the first ring to the second ring with support structure. This second embodiment further includes providing a multi-piece bump stop having at least a first bump stop piece and a second bump stop piece, locating the first bump stop piece in an area located radially downward of the first ring, moving the first bump stop piece radially upward toward the second ring, and securing the first bump stop piece to the first ring. This second embodiment also includes locating the second bump stop piece in an area located radially downward of the first ring, moving the second bump stop piece radially upward toward the second ring to a position adjacent to the first bump stop piece, and securing the second bump stop piece to the first ring.

In this second embodiment of a method, the first ring may optionally include a discrete first part and a discrete second part, and the step of securing the multi-piece bump stop to the first ring may include clamping the multi-piece bump stop between the first part and the second part.

Alternatively, in this second embodiment of a method, the support structure may include a plurality of spokes that are arranged in a first spoke group and a second spoke group, with the bump stop being located axially between the first spoke group and the second spoke group.

In this second embodiment of a method, the support structure may optionally be a webbing.

This second embodiment of a method may also optionally include attaching a hub to the first ring.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire comprising:
   an annular inner ring;
   an annular outer ring;
   a support structure extending from the annular inner ring to the annular outer ring;
   a tread disposed radially around the annular outer ring; and
   a bump stop including:
      an inner member radially extending from a radially outer surface of the annular inner ring, the inner member having a radially outer surface, wherein a first radial distance from the radially outer surface of the annular inner ring to the radially outer surface of the inner member is less than a second radial distance from the radially outer surface of the annular inner ring to an inner surface of the annular outer ring, and
      an outer member radially extending from a radially inner surface of the annular outer ring, the outer member having a radially inner surface facing the radially outer surface of the inner member.

2. The non-pneumatic tire of claim 1, wherein the inner member is laterally spaced from an outer perimeter of the annular outer ring.

3. The non-pneumatic tire of claim 1, wherein the radially outer surface of the inner member faces a radially inner surface of the annular outer ring.

4. The non-pneumatic tire of claim 3, wherein the radially outer surface of the inner member is spaced from the radially inner surface of the annular outer ring.

5. The non-pneumatic tire of claim 1, wherein the inner member has a compliant end defining the radially outer surface of the inner member, and wherein a modulus of elasticity of the compliant end is less than a modulus of elasticity of the inner member.

6. The non-pneumatic tire of claim 1, wherein the inner member has an outer compliant end defining the radially outer surface of the inner member and the outer member has an inner compliant end defining the radially inner surface of the outer member, wherein a modulus of elasticity of the outer compliant end of the inner member is less than a modulus of elasticity of the inner member, and wherein a modulus of elasticity of the inner compliant end of the outer member is less than a modulus of elasticity of the outer member.

7. The non-pneumatic tire of claim 1, wherein the inner member has a radially planar profile with respect to a radial cross-section.

8. The non-pneumatic tire of claim 1, wherein the support structure includes a first support structure axially spaced from a second support structure.

9. The non-pneumatic tire of claim 8, wherein the inner member is axially disposed between the first support structure and the second support structure.

10. The non-pneumatic tire of claim 1, wherein the tread includes a circumferential metal band.

11. A method of assembling a non-pneumatic tire comprising:
    providing an annular inner ring;
    providing an annular outer ring;
    providing a support structure extending from the annular inner ring to the annular outer ring;
    placing a tread radially around the annular outer ring; and
    radially extending a bump stop having an outer member from a radially inner surface of the annular outer ring, wherein the outer member has a radially inner surface facing a radially outer surface of the annular inner ring, and wherein a height of the bump stop is less than a radial distance between the radially outer surface of the annular inner ring and the radially inner surface of the annular outer ring.

12. The method of claim 11, wherein the radially inner surface of the outer member abuts the radially outer surface of the annular inner ring.

13. A non-pneumatic tire comprising:
    an annular inner ring;
    an annular outer ring;
    a support structure extending from the annular inner ring to the annular outer ring;

a tread extending radially around the annular outer ring; and a bump stop having an outer member radially extending from a radially inner surface of the annular outer ring, wherein the outer member has a radially inner surface facing a radially outer surface of the annular inner ring, and wherein a height of the bump stop is less than a radial distance between the radially outer surface of the annular inner ring and the radially inner surface of the annular outer ring.

14. The non-pneumatic tire of claim 13, wherein the radially inner surface of the outer member abuts the radially outer surface of the annular inner ring.

15. The non-pneumatic tire of claim 13, wherein the tread includes a circumferential metal band.

16. The non-pneumatic tire of claim 13, wherein the outer member has a radially planar profile with respect to a radial cross-section.

17. The non-pneumatic tire of claim 13, wherein the outer member has a radially non-planar profile with respect to a radial cross-section.

\* \* \* \* \*